US006901553B1

(12) United States Patent
Hayashi et al.

(10) Patent No.: US 6,901,553 B1
(45) Date of Patent: May 31, 2005

(54) APPARATUS AND METHOD FOR PROVIDING INTRINSIC ACCESS SPACE TO USER IN HYPERTEXT SPACE

(75) Inventors: Koichi Hayashi, Nakai-machi (JP); Shigehisa Kawabe, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/519,766

(22) Filed: Mar. 6, 2000

(30) Foreign Application Priority Data

Mar. 30, 1999 (JP) .......................................... 11-088168

(51) Int. Cl.[7] .............................................. G06F 15/00
(52) U.S. Cl. .................... 715/501.1; 715/513; 709/225
(58) Field of Search ......................... 715/501.1, 500.1, 715/513, 516, 526, 738, 744; 707/104.1, 10; 709/217, 245, 225; 345/738, 744

(56) References Cited

U.S. PATENT DOCUMENTS

| 6,023,701 A | * | 2/2000 | Malik et al. .................. 707/10 |
| 6,032,162 A | * | 2/2000 | Burke ..................... 715/501.1 |
| 6,049,812 A | * | 4/2000 | Bertram et al. ............. 715/516 |
| 6,119,135 A | * | 9/2000 | Helfman ..................... 715/513 |
| 6,208,995 B1 | * | 3/2001 | Himmel et al. ........... 707/104.1 |
| 6,211,871 B1 | * | 4/2001 | Himmel et al. ............. 345/744 |
| 6,275,862 B1 | * | 8/2001 | Sharma et al. ............. 709/245 |
| 6,460,058 B2 | * | 10/2002 | Koppolu et al. ............ 345/738 |
| 6,564,254 B1 | * | 5/2003 | Shoji et al. ................. 709/217 |

FOREIGN PATENT DOCUMENTS

| JP | 10-254758 | 9/1988 |
| JP | 9-50422 | 2/1997 |
| JP | 9-171450 | 6/1997 |
| JP | 10-222416 | 8/1998 |

OTHER PUBLICATIONS

P. James, "Official Netscape Navigator 3.0 Book, Windows Edition: The Difinitive guide to the Worlds Most Potpular Internet Navigator" International Thomson Publishing, Japan, 1996.

* cited by examiner

Primary Examiner—Joseph Feild
Assistant Examiner—MaiKhanh Nguyen
(74) Attorney, Agent, or Firm—Oliff & Berridge, PLC

(57) ABSTRACT

A specific access space for each user is selectively specified in the hypertext space having mutual link relation between one or more hypertexts provided by one or more servers. An analysis unit interprets a page request from a user and extracts the URL and space identification information of the requested page information. A page information request unit requests for the page information to be referred to by the extracted URL to the WWW server. A specific information addition unit takes out the link comment data corresponding to the space identification information and synthesizes a page by adding the comment to the received page information. The page synthesized page information instead of the requested page information is returned to the requester user.

11 Claims, 13 Drawing Sheets

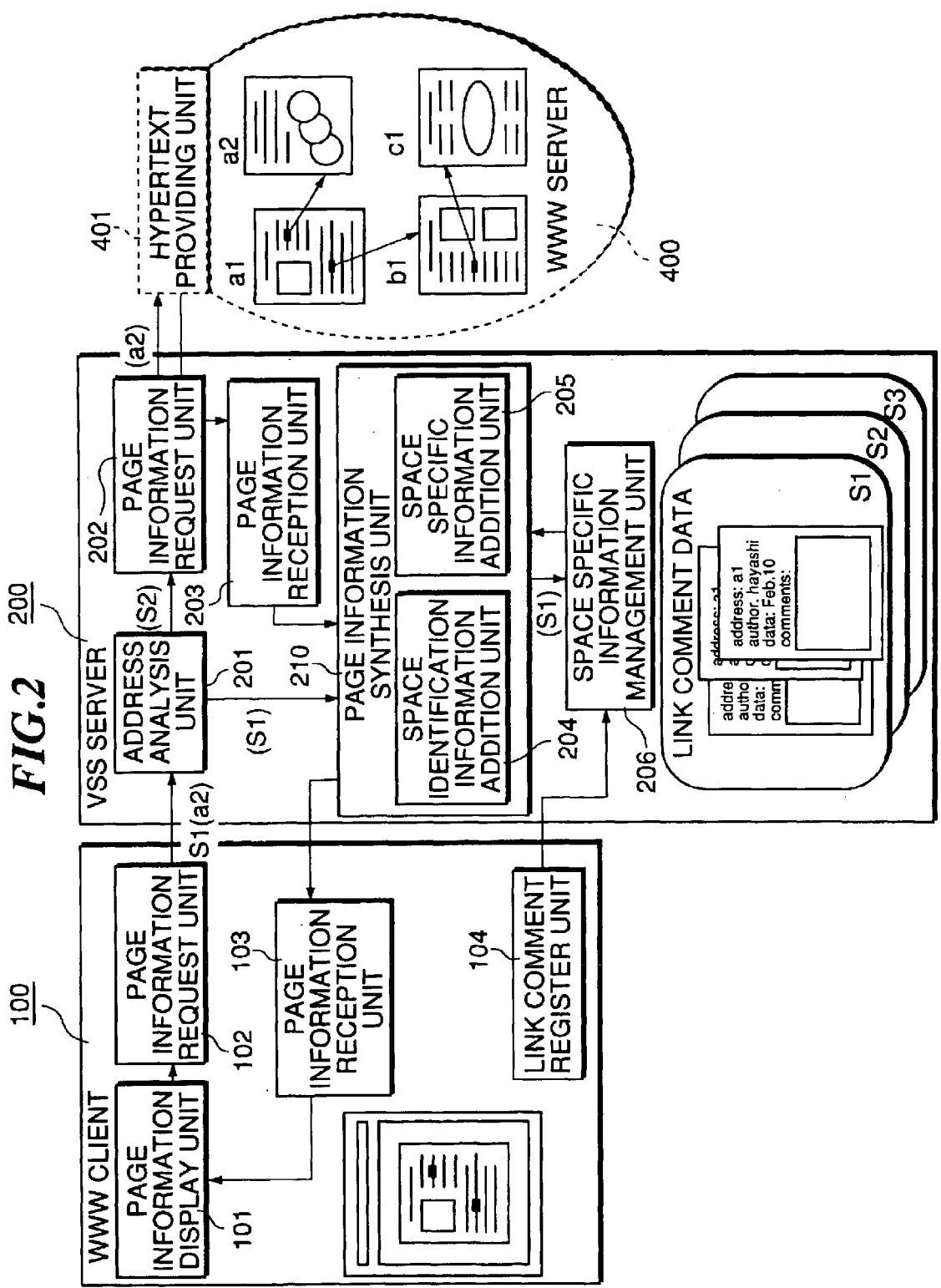

APPARATUS AND METHOD FOR PROVIDING INTRINSIC ACCESS SPACE TO USER IN HYPERTEXT SPACE

BACKGROUND OF THE INVENTION

1. Field of the Invention

This invention relates to an apparatus and a method for adding the information specific to a user (or user group) and performing application of a specific process simply in a hypertext space having the mutual link relation between one or more hypertexts provided by one or more servers, and relates more particularly to an apparatus and a method for providing a specific access space that specifies the specific link search path to a user (or user group) to add specific information or perform application of a specific process in a hypertext space.

The present invention relates further particularly to an apparatus and a method for selectively specifying an access space specific to a specified individual user (or specified user group that is in cooperation in hypertext search operation) in a hypertext space, and relates yet particularly to an apparatus and a method for providing an access space specific to a range defined dynamically by searching a hypertext space of the user.

2. Description of the Related Art

Currently, technology for mutually connecting computer systems together by means of a network namely "network computing" has been developed actively. The network of mutually connected computers is important for common mutual use of computer resources and for distribution and common use of information.

Various communication media for connecting computers mutually such as LAN (Local Area Network) installed in a limited space, for example, site of company or research institute, and WAN (Wide Area Network) that connects LANs mutually with a exclusive line are available. Recently, Internet, which is a huge network that covers the whole world, has been used popularly.

The internet was the network originated from ARPANET (Advanced Research Projects Agency Network) constructed by the U.S. Department of Defense, and then included in NSFNET (National Science Foundation Network) of National Science Foundation in the U.S. Afterwards, the backbone was transferred to the private sector in 1995, and then has been enlarged to the current scale. Servers (mainly UNIX workstations) installed in universities and research institutes have been voluntarily connected repeatedly, as the result, the network has grown to the literal world scale network. Servers on the Internet are connected by means of TCP/IP (Transmission Control Protocol/Internet Protocol).

Numerous servers are connected on the Internet, and each server opens the resource owned by the server itself to numerous clients. For example, resource supply services such as WWW (World Wide Web), FTP (File Transfer Protocol), NEWS, and Gopher are opened on the Internet, and the access to the Internet has become easy for clients. Particularly, WWW is considered to be one important factor that has popularized the Internet rapidly.

Each resource object distributed on the Internet is specified by means of the reference called as URL (Uniform Resource Locator). URL is a character string that specifies the name of a resource, and described as scheme name (protocol name)://host name (domain name):port number/path name (file name). URL is described in, for example, RFC1738 and RFC1808. The host name defined herein is in compliance with the DNS (Domain Name System) system, which is the name service used in TCP/IP (Transmission Control Protocol/Internet Protocol) network. The logical group called as domain can be set hierarchically in DNS, and the domain name, which is the name of the logical group, is incorporated in the computer name (host name) as a portion thereof, and the incorporated name is used. The DNS server has a corresponding table between the domain name and IP address, and returns the pertinent IP address in response to the request based on the domain name (well known).

WWW, which is the representative application in the Internet, is a distributed information retrieval system that provides the resource object of the hyperlink structure namely "hypertext" widely on the Internet, and has www servers that are distributed worldwide. Resource access is performed usually according to HTTP (Hypertext Transfer Protocol) between a WWW server and a WWW client. HTTP protocol is described in, for example, RFC (Request For Comments) 1945 and RFC2068.

The resource object that is most popularly used in WWW resource space (namely which the WWW server provides) is the hypertext document that is described in the language of HTML (Hypertext Markup Language). HTML is described in, for example, RFC1866. The HTML resource object distributed on the WWW resource space has the above-mentioned URL reference ("http" is used as the scheme name).

Herein, "hypertext" treats characters, picture, and table, which constitute a file, as the object such as a card, further forms the correlation between objects namely links and has the function to refer each other via links (well known). For example, plural pieces of link information to other resource objects is embedded in the HTML document on the WWW resource space. Link information embedded in the HTML document is also the reference described in URL.

The WWW server is usually a computer system that operates with using a server application dedicated to the WWW server, has plural resource objects with hypertexts described in HTML, and offers resource supply service to the WWW client. In other words, the information supplier accumulates the information to be supplied in the WWW server as the resource object described in HTML and opens it on the Internet to thereby achieve the information supply to the WWW client.

On the other hand, a WWW client that requests a resource object on the WWW resource space is usually a computer that operates with using an application called as "WWW browser".

The browser is a type of user agent that takes in the resource object for another, which appears on the desktop screen of a client in the form of "browser window". The WWW browser searches the source space having the hyperlink structure on the network according to the URL entered in the prescribed box on the browser window by using a key, retrieves the resource object corresponding to the URL namely HTML document, and downloads it. The content of the acquired HTML document is used as the page information used for assembling the page (homepage) screen. In other words, the WWW browser analyzes the HTML document and displays the page screen on the browser window screen.

Generally, on the page display screen, the display object relative to the link information to other resource objects is hot-spot displayed as "anchor", a user can detect intuitively the location of the link information scattered on the page display screen. The actual form of the link information pasted on the page display screen is the reference linked to resource objects, and described in URL form. A user can specify the next linked resource object by performing intuitive operation, that is, the user clicks an interested anchor on a homepage screen with a mouse. The WWW browser searches the resource object corresponding to the URL embedded in the anchor in response to the click operation to the anchor, and realizes the reference to the link destination.

In other words, the WWW browser searches the WWW resource space developed worldwide scale by means of the URL, and a user can thereby get the desired resource object readily. A user can reach to desired information by searching from the various view points on the resource space by use of the mutually defined link information of the hypertext namely HTML.

The resource space including hypertext having mutual linking is called as "hypertext space" hereinafter.

The link information between resource objects on the WWW resource space namely hypertext space is formed by numerous information suppliers who prepare the hypertext. Information suppliers are scattered on the WWW resource space, and the intention and policy of these resource supply are widely diversified. Therefore, the link structure defined by these numerous information suppliers is not necessarily the convenient hyperlink structure for information users namely WWW clients. In other words, it is not necessarily true that a client user can trace the path easily on the hypertext space. Particularly, because now huge quantity of information is accumulated on the WWW resource space, how to simply and efficiently access to desired information namely resource object is the important technical subject.

The same search area is searched repeatedly very often by a single user or plural users. For example, in some cases, the same information as used in the previous work is searched when the same type of information searching work is performed on the WWW resource space. In some cases, a co-worker working for the same purpose has searched and got the same information already. Furthermore, in some cases, persons who work for a related purpose in separate places have searched the same information, or other persons who have the same taste or interest have searched the same information. Reuse of the search history of the WWW resource space in the past would be helpful for users to search with improved hypertext research efficiency.

Some techniques for improving the searching work efficiency by utilizing the search result obtained commonly or privately have been proposed.

For example, Japanese Published Unexamined Patent Application No. Hei 10-254758 discloses "Document Perusal System" in which specific information is added to the page address searched by individuals. In this document perusal system, correlated specific information specific to the specified page address is stored in a data relaying system called as "proxy". When the page information is perused, it is possible to peruse the information that has been written by the user itself in the past when the user searched and written by other persons by showing the added information.

The specification of the research path in the hypertext space having mutual link is referred to as "access space", then the document perusal system disclosed in Japanese Published Unexamined Patent Application No. Hei 10-254758 is a technique that provides the access space of the user specific to the hypertext space. The specific access space is the hypertext space that forms the link relation different from the original hypertext space to be optimized for the purpose of the user.

For example, the browser product of U.S. Netscape's "Netscape Navigator" is an another example of the technique for reusing the searched result and history obtained by individuals, and it is provided with "bookmark" function. In this system, users of this browser classified/organized and stored the reference of the information namely the URL of the page that users of the browser thought important. The "bookmark" allows a user to call the URL list registered in the bookmark to access easily when the same information is accessed again. Furthermore, common use of the bookmark by plural users enables users to use the searched result obtained by individuals.

However, the above-mentioned known techniques in which the access space specific to the hypertext space is provided by use of the specific information accumulated when the hypertext space has been searched in the past is disadvantageous from the view point of the convenience of recording of the specific information and convenience of the specific access space.

First, the former technique in which the common information is added by use of proxy is disadvantageous in that it is difficult to select the specific access space of each user (or user group who is cooperating in hypertext searching work). The unit used for managing the specific information is variously different, for example, it may be a workplace for working with a common purpose or may be a community of users having the common interest. Such user unit may be limited to a specified department or section (namely local organization), on the other hand, may be scattered in remote locations by way of an external network. On the other hand, the management unit by means of proxy for data relaying is the unit that partitions generally between the internal network, such as company and business establishment of a company, and the external network, and this unit is apparently different from the unit for common use of the specific information for access to the hypertext space.

The latter bookmark only holds the address (URL) that is the entrance to refer the page information. Therefore, it is required for users to refer mutually the content of the bookmarks of individual users in order to commonly use the information of the page content such as comment to the page information between plural users. Furthermore, it is required that the whole page information is displayed on a browser screen even when only partial link information included in the page corresponding to a certain URL is needed. In other words, the simple management of bookmark requires waiting time until the corresponding whole page is fabricated on a screen every when one URL in the bookmark is referred to, and the reference efficiency of the information is low.

SUMMARY OF THE INVENTION

The present invention has been made in view of the above circumstances, and has been accomplished to provide an excellent apparatus and a method that are capable of adding the specific information to a user (or user group) or performing application of a specific process in the hypertext space structured by means of mutual link relation between one or more hypertexts provided by one or more servers.

The present invention also provides an excellent apparatus and a method that are capable of providing a specific access space for specifying the link search path for adding the specific information to a user (or user group) or performing application of the specific process in the hypertext space. The specific access space that is referred to herein means the hypertext space that is in conformance with the purpose of users and in which the link relation different from the original hypertext space is formed.

The present invention further provides an excellent apparatus and a method that are capable of selectively specifying an access space specific to each specified personal user (or a user group that is working cooperatively in hypertext searching work) in the hypertext space.

The present invention yet further provides an excellent apparatus and a method that are capable of providing the specific access space to the area defined dynamically by user searching in the hypertext space.

The present invention still further provides an excellent apparatus and a method that are capable of taking out necessary information to the link group specified by a user to thereby perform a process in which a new page is synthesized easily.

The present invention yet further provides an excellent apparatus and a method that are capable of making specification of multi-stage synthesis processing of pages simply.

According to an aspect of the present invention, the apparatus for providing a specific access space that specifies a path specific to a user who searches a hyperlink in a hypertext space composed of mutual link relation between one or more hypertexts provided by one or more servers includes a first unit that adds space identification information to specific information for each user relative to page information and manages it in correlation with a reference to the page information, a second unit that takes specific information corresponding to requested page information out of the first unit and adds it to the page information, and a third unit that replaces the reference included in the page information with the space identification information.

According to another aspect of the present invention, the apparatus includes a first unit that adds space identification information to specific information for each user relative to page information and manages it in correlation with a reference to the page information, a second unit that takes specific information corresponding to requested page information out of the first unit and adds it to the page information, a third unit that replaces the reference included in the page information with the space identification information, and a fourth unit that registers the specific information relative to the page information at the first unit.

According to another aspect of the present invention, the apparatus includes a space specific information management unit that adds space identification information to specific information for each user relative to page information and manages in correlation with a reference to the page information, an analysis unit that interprets a page request from a user and extracts a reference of requested page information and the space identification information, a page information request unit that requests page information referred to by the reference extracted by the analysis unit to a server which provides the hypertext, a page information reception unit that receives the page information from the server which provides the hypertext, a specific information addition unit that takes the specific information out of the space specific information management unit corresponding to the space identification information extracted by the analysis unit and adds the specific information of the received page information to the page information, and a space identification information addition unit that replaces the reference included in the received page information with the corresponding space identification information. Page information synthesized by the specific information addition unit and the space identification information addition unit is provided to the user instead of an original page information referred to by a reference specified by the user.

In some cases, the user leaves comments relative to the path that is searched in the past. In the apparatus in accordance with the preceding aspect, the specific access space that specifies the specific path relative to hyperlink searching for each user (or user group) is structured based on the user comment. In other words, the specific access space defines the specific information such as the user comment to the page information by means of the link comment data correlated to the reference of the page information. Space identification information is added to each link comment data, and managed by the space specific information management unit.

The analysis unit interprets the page request received from the user and extracts the reference of the requested page information and space identification information. The user mentioned herein means a WWW client which is activating the WWW browser.

The page information request unit requests for the page information referred to by the reference extracted by the analysis unit to the WWW server who provides the hypertext. The page information reception unit receives the page information from the WWW server who provides the hypertext.

The specific information addition unit takes out the link comment data from the space specific information management unit corresponding to the space identification information extracted by the analysis unit and adds the comment to the received page information. Furthermore, the space identification information addition unit takes out the space identification information from the space specific information management corresponding to the reference included in the received page information unit and replaces the reference with the space identification information. As described hereinabove, a page that provides the access space specific to the user is synthesized instead of the original hypertext space based on the requested page information.

The synthesized page information instead of the requested page information itself is returned to the requester user. As the result, on the page displayed on the computer screen of the WWW client of the requester, the specific information of the personal user (or specific information of the user group who is working cooperatively in hypertext searching work) is added, as well as the page provides the specific access space having the specific searching path. The user can search the hypertext efficiently based on the displayed specific information and specific access space.

According to another aspect of the present invention, the apparatus includes a space specific information management unit that receives, from a user, specific information for page information that is a constituent of the hypertext and manages it in correlation with a reference to the page information by space identification information, an analysis unit that interprets a page request from a user and extracts a reference of the requested page information and the space identification information, a page information request unit that requests page information referred to by the reference extracted by the analysis unit to a server which provides the hypertext, a page information reception unit that receives the requested page information from the server which provides the hypertext, a specific information addition unit that takes the specific information corresponding to the space identification information extracted by the analysis unit out of the space specific information management unit and adds the specific information to the corresponding received page information, and a space identification information addition unit that replaces a reference included in the received page information with the corresponding space identification information. Page information synthesized by the specific information addition unit and the space identification information addition unit is provided to the user instead of an original page information referred to by a reference specified by the user.

The apparatus in accordance with this aspect configures the specific access space based on the link comment data in the same manner as described in the next preceding aspect, and the space specific information management unit manages the specific access space. In this aspect of the present invention, furthermore input such as registration request for comment from a user to the space specific information management unit is received. Thereby, it is possible to provide the specific access space to the range dynamically determined by the searching result performed in the hypertext space by the user.

According to another aspect of the present invention, the apparatus includes a first unit that groups one or more links that refer to page information and manages the grouped links as link group data, and a second unit that applies a requested process to each link included in the link group requested to be processed.

According to another aspect of the present invention, the apparatus includes a first unit that groups one or more links that refer to a page information and manages the grouped links as a link group data, a second unit that applies a requested process to each link included in the link group requested to be processed, and a third unit that registers information relative to the link group at the first unit.

According to another aspect of the present invention, the apparatus includes a space specific information management unit that groups one or more links that refer to page information and manages the grouped links as link group data to which a link group identifier is added, an analysis unit that interprets a process request from a user and extracts a requested link group identifier and a process to be applied, a unit that takes the link group data corresponding to the link group identifier extracted by the analysis unit out of the space specific information management unit, a page information request unit that requests page information referred to by each link included in the extracted link group data to a server which provides the hypertext, a page information reception unit that receives the page information from the server which provides the hypertext, and a page information synthesis unit that applies the process extracted by the analysis unit to the whole page information referred to by each link included in the link group to synthesize a virtual page. Information of the virtual page is provided to the user instead of original page information referred to by each link included in the link group specified by the user.

The user accumulates the searched information and know-how obtained as the result of the hyperlink searching in various forms. For example, the link information that is correlated each other closely out of the referred page information is grouped and the grouped link information is managed. In the apparatus in accordance with this aspect, the user configures the specific access space that specifies the specific path relative to the hyperlink searching for each user (or user group) based on the data relative to the grouped link. In other words, the specific access space is defined by means of the link group data added with the link group identifier which link group has been formed by grouping one or more links that refer to the page information. Each piece of link group data is added with a link group identifier, and managed by the space specific information management unit.

The analysis unit interprets the process request received from the user and extracts the requested link group identifier and the process requested to the link group. The analysis unit searches in the space specific information management unit, and takes out the link group data corresponding to the extracted link group identifier. The user mentioned herein means a WWW client which is activating the WWW browser.

The page information request unit requests for the page information referred to by each link included in the taken out link group data to the WWW server who provides the hypertext. The page information reception unit receives each piece of requested page information from the WWW server who provides the hypertext.

The page information synthesis unit applies the process requested to the respective page information referred to by each link included in the link group and synthesizes a virtual page. The process mentioned herein means, for example, summarizing respective page information (summary) or synthesizing plural pieces of page information together (merge).

The information of the synthesized virtual page is returned instead of the requested page information itself to the requester user. The virtual page formed by applying the predetermined process to the page information of the grouped each link is displayed on the computer screen of the requester WWW client.

It is preferable to apply the process such as summary or merge to the original information in order to search the hypertext efficiently. The type of process to be applied is specific to each user. According to the apparatus in accordance with this aspect, the specific process to the page information referred to by the link is applied easily. As the result, the hypertext is searched efficiently based on the specific access space.

It is possible to takes out the information required for the link group specified by the user and to synthesize a new page easily.

The apparatus in accordance with this aspect may further include a unit that receives a user's instruction about registration of contents of the link group data, such as the link groups, each link included in each link group, and the process to be applied to each link group or each link included in each link group.

In the apparatus in accordance with this aspect, the space specific information management unit may manage the process to be applied to the link included in the link group in correlation with the link, and the page information synthesis unit may apply the process correlated to the link to the page information referred to by the link and then apply the process requested for the link group to the whole link group. Thereby, it is possible to indicate the multi-stage page synthesis process easily.

The apparatus in accordance with this aspect may further includes a unit that converts the link group or the link correlated to the process to be applied into process component and holds the component.

The apparatus in accordance with this aspect may further includes a process component display unit that shows the user the link group or the link that has been converted into the process component as a process component icon.

The apparatus in accordance with this aspect may further includes a hypertext analysis unit that analyzes the page information referred to by the link selected by the user and registers the link group having the link that is included in the page information.

According to another aspect of the present invention, the method for providing a specific access space that specifies a path specific to a user who searches a hyperlink in a hypertext space composed of mutual link relation between one or more hypertexts provided by one or more servers, in which the specific access space is composed of space specific information for each user, and each piece of space specific information is identifiable by means of space identification information and specific information of the user relative to page information is held in correlation with a reference to the page information, includes the steps of (a) interpreting a page request from a user and extracting a reference of requested page information and the space identification information, (b) requesting page information referred to by the reference extracted in step (a) to a server which provides a hypertext, (c) receiving the requested page information from the server which provides the hypertext, (d) taking specific information for the page information received in step (c) out of the space specific information corresponding to the space identification information extracted in step (a), and adding the specific information to the page information, (e) replacing the reference included in the received page information with the corresponding space identification information, and (f) providing the user with page information synthesized in steps (d) and (e) instead of original page information referred to by a reference specified by the user.

According to another aspect of the present invention, the method for providing a specific access space that specifies a path specific to a user who searches a hyperlink in a hypertext space composed of mutual link relation between one or more hypertexts provided by one or more servers, in which the specific access space is composed of space specific information for each user, and each piece of space specific information is identifiable by means of space identification information and specific information relative to page information received from the user is held in correlation with a reference to the page information, includes the steps of (a) interpreting a page request from a user and extracting a reference of requested page information and the space identification information, (b) requesting page information referred to by the reference extracted in step (a) to a server which provides a hypertext, (c) receiving the requested page information from the server which provides the hypertext, (d) taking specific information for the page information received in step (c) out of the space specific information corresponding to the space identification information extracted in step (a), and adding the specific information to the page information, (e) replacing the reference included in the received page information with the corresponding space identification information, and (f) providing the user with the page information synthesized in steps (d) and (e) instead of the original page information referred to by the reference specified by the user.

According to another aspect of the present invention, the method for providing a specific access space that specifies a path specific to a user who searches a hyperlink in a hypertext space composed of mutual link relation between one or more hypertexts provided by one or more servers, in which the specific access space is composed of a link group formed by grouping one or more links that refer the page information and assigned a group identifier to be managed as link group data, includes the steps of (a) interpreting a process request from a user and extracting a requested link group identifier and the process to be applied, (b) requesting page information referred to by each link included in link group data corresponding to the link group identifier extracted in step (a) to a server which provides a hypertext, (c) receiving the requested page information from the server which provides the hypertext, (d) applying the process extracted in step (a) to the whole page information referred to by each link included in the link group to synthesize a virtual page, and (e) providing the user with information of the virtual page instead of original page information referred to by a reference specified by the user.

BRIEF DESCRIPTION OF THE DRAWINGS

Preferred embodiments of the present invention will be described in detail based on the followings, wherein:

FIG. 2 is a block diagram for logically describing the internal structure of a VSS server 200 and a WWW client 100 in accordance with the first embodiment of the present invention;

DETAILED DESCRIPTION OF THE PREFERRED EMBODIMENTS

The embodiments of the present invention will be described in detail hereinafter with reference to the drawings.

Figure 1:
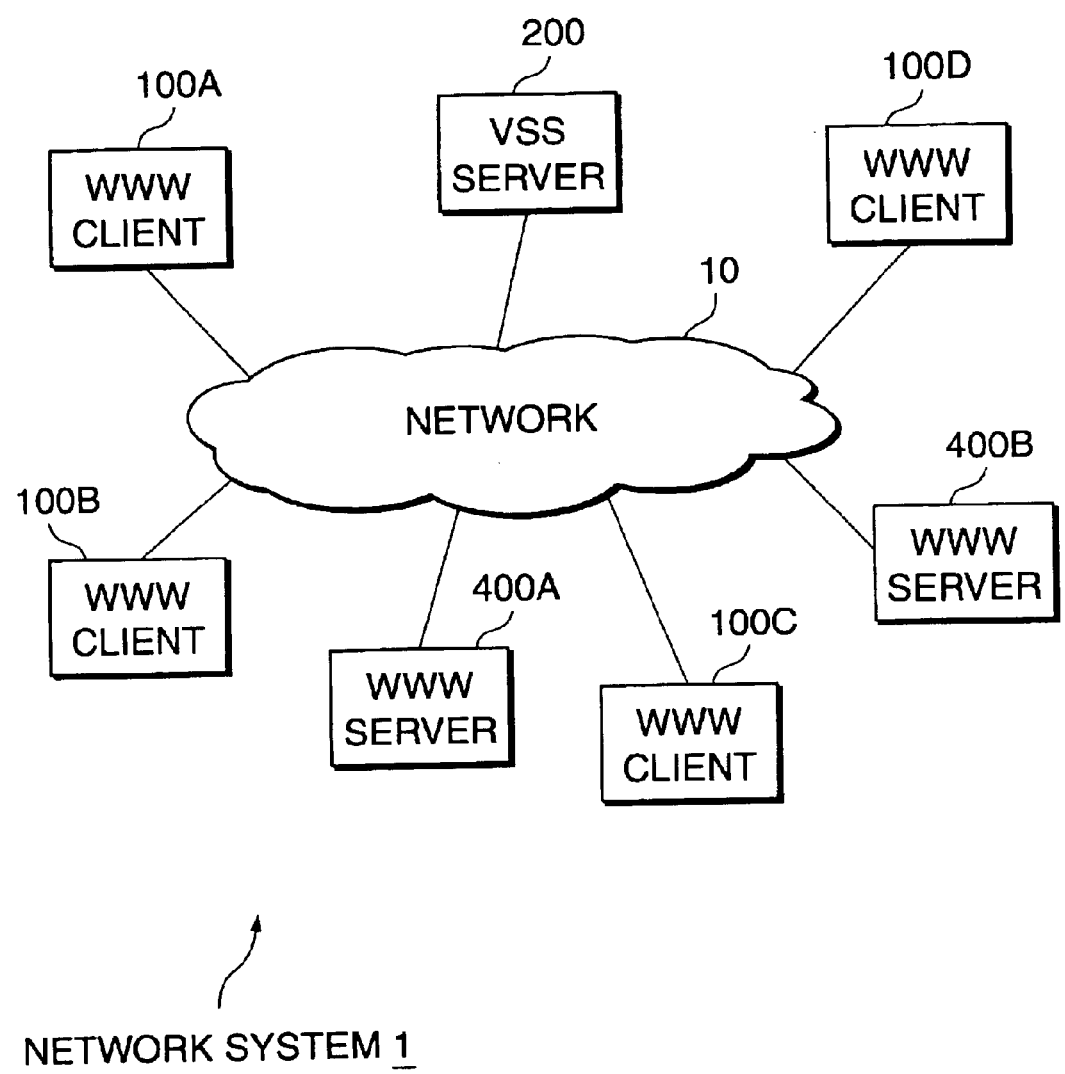
FIG. 1 schematically illustrates the structure of a network system 1 served for application of the present invention.

FIG. 1 shows the structure of the network system 1 schematically used in the present invention. The network system that is a network 10, namely a transmission medium of the data, to which a large number of computer systems are connected, provides a so-called distributed computing environment. Each unit will be described hereinafter.

The network 10 is a LAN (Local Area Network) installed in a space limited to, for example, a university or a site of company. The network 10 may be a WAN (Wide Area Network) of LANs mutually connected with a dedicated line, a general circuit-switched public network (PSTN: Public Switched Telephone Network), ISDN (Integrated Service Digital Network), or "Internet" that is a huge aggregate of these networks. Each computer system is connected to the network 10 by way of a network interface card (NIC). Computer systems are connected to each other according to, for example, TCP/IP (Transmission Control Protocol/Internet Protocol) by way of the network 10.

The network system 1 of this embodiment is structured as a distributed environment client server type model in which some computer systems on the network 10 are designated as server 400A, . . . , servers 400 provides resource supply service, and one or more clients 10A, . . . use the resource service commonly.

For example, if the client server type model structured on the network 10 is the WWW (World Wide Web), a message is transmitted on the network 10 between client servers and servers according to the HTTP (Hypertext Transfer Protocol) The message in compliance with HTTP is a type of remote method calling (RMI: Remote Method Invocation).

Some servers on the network 10 are WWW servers A, . . . who provide WWW service to WWW clients, hold the hypertext described in HTML (Hypertext Markup language) as the resource object, and implement the resource supply service according to HTTP (Hypertext Transfer Protocol). The hypertext constitutes the page information. The each resource object has the reference described in URL (Uniform Resource Locator) (as described hereinabove).

The WWW clients 00A, . . . are general purpose computer systems that start up, for example, WWW browser, and specify the desired resource object such as the hypertext in URL format to request the resource supply service to a server.

Some other servers 200 on the network 10 shown in FIG. 10 are operated as VSS (Virtual Space Server) that provides specific access space structured virtually to each WWW client user (or user group). The specific access space that is referred to herein means the hypertext space that is in conformance with the purpose of users and in which the link relation different from the original hypertext space is formed. It is assumed that the VSS server 200 has a domain name "vss". The detail of the resource supply service realized by the VSS server 200 will be described hereinafter.

First Embodiment

FIG. 2 is a block diagram for logically illustrating the internal structure of the VSS server 200 and WWW client 100 in accordance with the first embodiment of the present invention. The VSS server 200 and the WWW client 100 are connected actually by way of the network 10, but in this drawing the connection according to the data communication relation is described schematically. Each unit will be described hereinafter.

The WWW client 100 is provided with a page information display unit 101, a page information request unit 102, a page information reception unit 103, and a comment register unit 104. Such structure is built logically by means of cooperative action of the hardware and software of a computer by executing a predetermined software on the computer system that is a component of the WWW client 100. The WWW client 100 is realized by use of the standard WWW browser served for searching the hypertext information, for example, in the WWW resource space.

The page information display unit 101 analyzes the HTML document received from the WWW server 400 to fabricate the page screen information, and displays it on the computer screen not shown in the drawing. The page information display unit 101 is based on the function that the standard WWW browser provides.

The page information request unit 102 transmits the page address specified by a user, namely the information of the page that the URL indicates, to the WWW server 400 in the request message format. A user can request the page information by means of direct key input of URL character string in the input box displayed on the browser window screen or by clicking on the anchor where the reference is embedded on the HTML document namely page display screen (well known). The page information request unit 102 is based on the function that the standard WWW browser provides.

For example, when a user refers to the page information a2 by way of the specific access space S1, a page request (herein, the page request is referred to as "S1(a2)" as described in FIG. 2) including the identification information of the specific access space S1 is issued in addition to the address of the page information a2 (namely URL).

The page information reception unit 103 acquires the request page information from the WWW server 400 in the format of the response message. A page screen fabricated based on the acquired page information is displayed on the page information display unit 101 namely computer screen of the WWW client. The page information reception unit 103 is based on the function that the browser provides.

The comment register unit 104 registers the input specific information entered by a user (or user group) as the comment data corresponding to the address of the page information namely the URL. The "registration" of the link comment that is referred to herein means registration in the space specific information management unit 206 (described hereinafter) of the VSS server 200. The link comment register unit 104 described the input form of the link comment data by use of the script language supplied by the standard WWW browser and performs the registration request to the space specific information management unit 206.

On the other hand, VSS server 200 has an address analysis unit 201, a page information request unit 202, a page information reception unit 203, a page information synthesis unit 210, and the space specific information management unit 206. The page information synthesis unit 210 contains a space identification information addition unit 204 and a space specific information addition unit 205. However, such structure is actually built logically by means of cooperative action of the hardware and software of a computer by executing a predetermined software on the computer system that is a component of the VSS server 200.

The VSS server 200 of the present invention is a server for preparing the specific access space for each user (or user group who is working in cooperation in the hypertext searching work), and is structured by use of the server described in "Hypertext management apparatus" described in Japanese Published Unexamined Patent Application No. Hei 10-222416.

The address analysis unit 201 analyzes the request message from the WWW client 100 and separates it into the page address and space identification information. In the example shown in FIG. 2, the received message "S1(a2)" is separated into the space identification information "S1" and the page address "a2', and the former is supplied to the page information synthesis unit 210 (described hereinafter) and the latter is supplied to the page information request unit 202.

The page information request unit 202 requests the page information, to which the separated and obtained page address refers, to the WWW server 400 which holds it. In the example shown in FIG. 2, the page information request unit 202 requests the page information "a2".

The WWW server 400 holds the hypertext resource described in HTML format and provided with a hypertext providing unit 401 that executes the resource providing service in response to the resource service request. The hypertext providing unit 401 sends out the hypertext resource corresponding to the requested page address as the page information "a2".

The page information reception unit 203 acquires the requested page information from the WWW server 400.

The page information synthesis unit 210 synthesizes new page information based on the material of plural pieces of page information and returns the result to the WWW client 100. The page information synthesis process is implemented by cooperative action (described hereinafter) of sub modules namely the space specific information addition unit 205, space identification information addition unit 204 and space specific information management unit 206 shown hereinafter.

The space specific information addition unit 205 takes out the information of the specific access space specified by the space identification information, and adds it to the page information. In the example shown in FIG. 2, the specific access space corresponding to the space identification information "S1" is taken out, and the specific information held by the specific access space is added to the ordinary page information "a2".

The space identification information addition unit 204 replaces the address of the link contained in the page information with the address having the space identification information. For example, in the example shown in FIG. 2, the link information contained in the page information "a2" is replaced from the ordinary address (URL) of the page information referred to by the link to the address (URL) of the format that refers to the page information by way of the specific access space S1.

The space specific information management unit 206 manages the specific information (comment) entered by a user (or user group) as the link comment data correlated to the page address. The link comment data of the format described in the script language provided by the standard www browser is sent from the link comment register unit 104 of the WWW client 100 (described hereinabove).

In this embodiment, the space specific information management unit 206 prepares the specific access space for each user (or user group who is working cooperatively in hypertext searching work), and manages each specific access space by means of the space identification information. In the example shown in FIG. 2, three specific access spaces namely "S1", "S2", and "S3" are prepared. The space specific information management unit 206 correlates the link comment data received from a user namely WWW client 100 to the page address, and stores it in the corresponding specific access space. The space specific information management unit 206 takes out the link comment data corresponding to the specified space identification information in response to the request from the space specific information addition unit 205.

In [Table 1] shown herein under, one exemplary structure of the link comment data managed in the space specific information management unit 206 is shown. This data structure defines the specific access space "S1".

TABLE 1

| address | comments |
| --- | --- |
| http://A/a1 | (Feb. 10, hayashi, "tough competitor to product Y") |
|  | (Feb. 12, kawabe, "amazing cost performance") |
| http://A/a2 | (Feb. 10, hayashi, "related to product Y") |
| http://B/b1 | (Feb. 10, kawabe, "related to product Y") |
|  | (Feb. 11, hayashi, "a lot of interesting features") |
| http://C/C1 | (Feb. 10, kawabe, "it is not important") |

*address is the address (URL) of the reference page. One entry is formed for each address.
*comments is the comment to which each user added on the reference page. The comment is described in the format (date, user name, and comment content), the arbitrary number of comments are registered in one entry.

In FIG. 3A to FIG. 3D, the hypertext searching sequence in the WWW resource space is illustrated. The hypertext searching itself shown in FIG. 3A to FIG. 3D is achieved similarly by the conventional art.

Figures 3A, 3B:
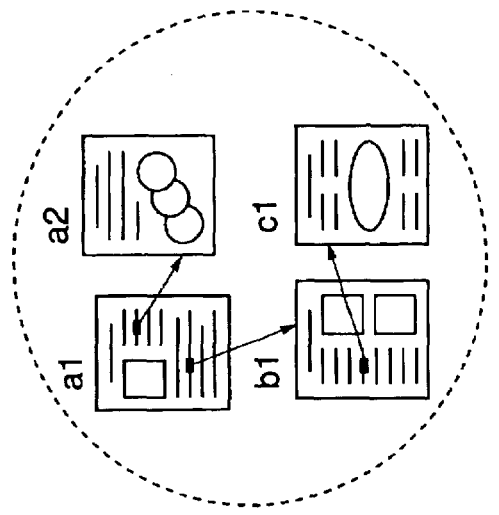
FIG. 3A to FIG. 3D illustrate the hypertext searching process in a WWW resource space.

FIG. 3A and FIG. 3B show the result obtained when the hypertext is searched by use of the WWW browser. Herein, FIG. 3A shows the browser window screen that displays the page "a1" relative to "COMPANY A", and the page address namely URL is "http://A/a1" as shown in FIG. 3A. FIG. 3B shows the browser window screen that displays the page "b1" relative to "COMPANY B", and the page address namely URL is "http://B/b1". Because URL is described in the format "http://host name/filename" (well known), "http://A/a1" means a request for the page information "a1" to the server A, and "http://B/b1" means a request for the page information "b1" to the server B.

In the page screen shown in FIG. 3A, two anchors namely "a2" and "b1" are shown, these anchors show that the link information to other different hypertexts namely page information "a2" and "b1" are embedded respectively. In this example, the link information to respective pages is described in the URL format as "http://A/a1" and "http://B/b1" according to the usual format. Similarly, an anchor in which link information namely "c1" to other page information "c1" is embedded is displayed on the page screen shown in FIG. 3B, and the link information to the corresponding page is described in the URL format as "http://C/c1".

For example, the WWW browser searches the hypertext corresponding to the embedded link information "http://B/b1" in response to selection (namely clicking with a mouse) of the anchor "b1" on the browser window screen shown in FIG. 3A by a user, and acquires the corresponding page information. As the result, the page display of the page "b1" as shown in FIG. 3B namely homepage screen of "COMPANY B" is obtained.

Figure 3C:
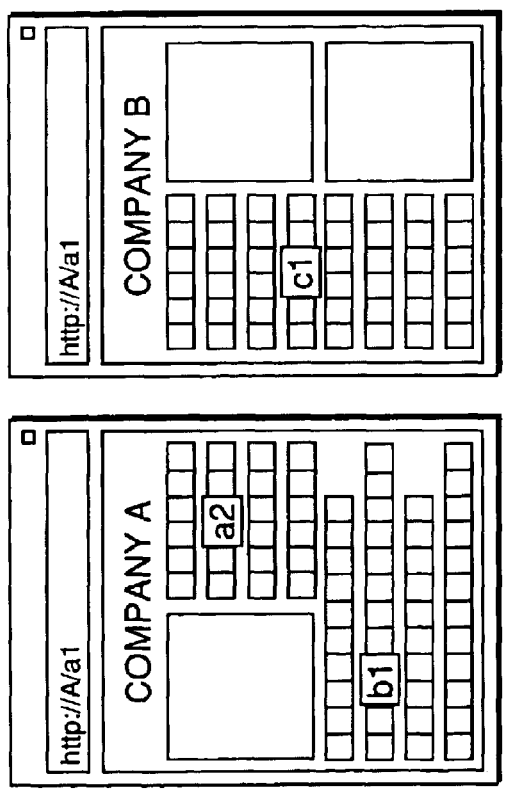

The link relation between pages used in this example namely hypertext space is illustrated in FIG. 3C. The link relation formed between page information namely hypertexts "a1", "a2", "b1", and "c1" is understood as a type of spatial expression.

Figure 3D:
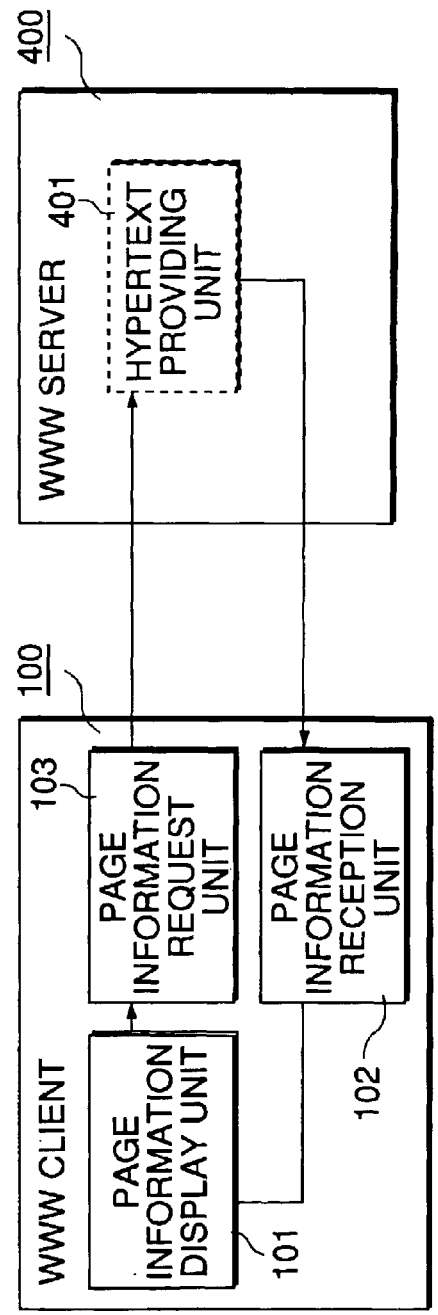

In FIG. 3D, the structure of the WWW server 400 and the WWW client 100 for realizing the hypertext search in this example is shown schematically. The WWW server 400 holds the resource object having hypertexts and provided with the hypertext providing unit 401 for providing resource supply service in response to the request. On the other hand, the WWW client 100 includes a page information reception unit 103 for receiving the hypertext as the page information from the WWW server 400, a page information display unit 101 for displaying the page information received from the WWW server, and a page information request unit 102 that requests the page address specified by a user namely the page information indicated by the URL to the WWW server 400. The WWW client 100 is realized by use of the standard WWW browser.

Figure 4C:
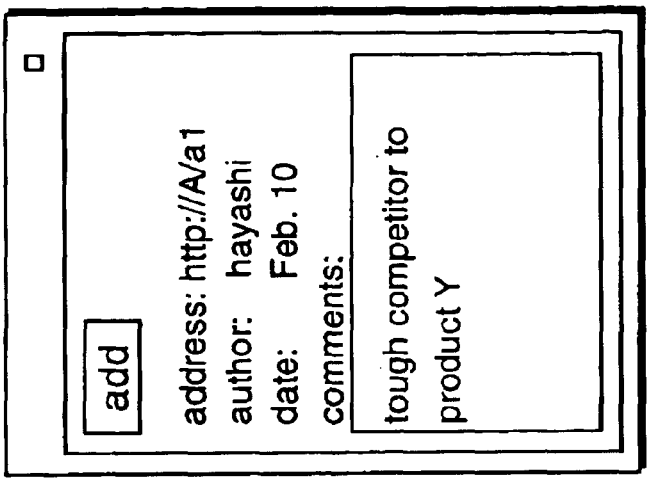
FIG. 4A to FIG. 4C schematically illustrate the hypertext searching process implemented by the VSS server 200 and the WWW client 100 in accordance with the first embodiment of the present invention.
Figure 4B:
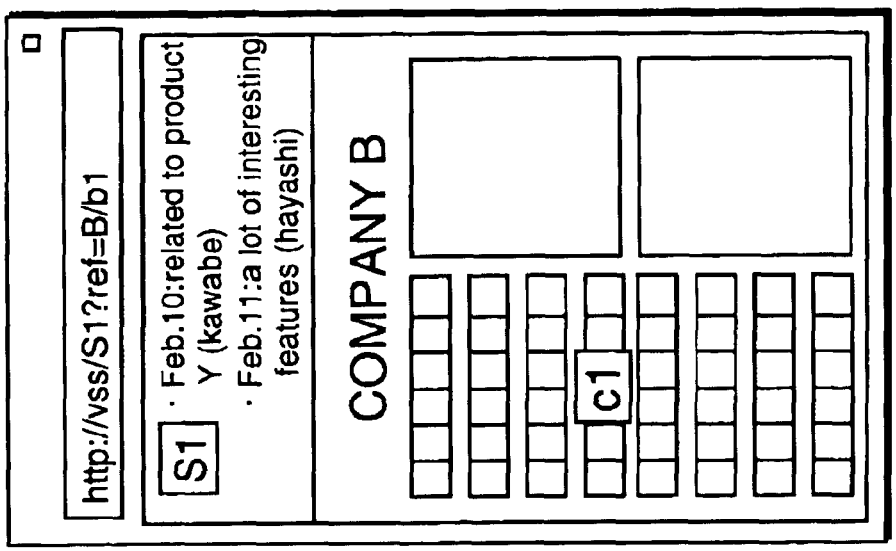
Figure 4A:
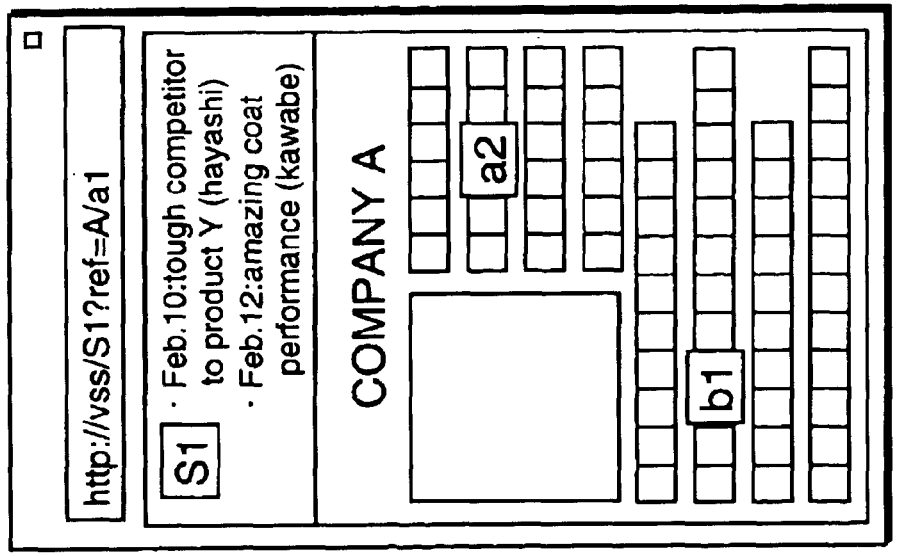

In FIG. 4A to FIG. 4C, the sequence of hypertext searching realized by the VSS server 200 and the WWW client 100 in accordance with this embodiment is shown schematically.

FIG. 4A shows the display of the page information of "COMPANY A" displayed by way of the specific access space "S1". "http://vss/S1?ref=A/a1" is entered as the URL in the input box of the browser window screen. This URL character string requests the information of the page "a1" similarly to the example shown in FIG. 3A. While the URL in the case of FIG. 3A requests the page "a1" directly to the WWW server 400 in the WWW browser screen, the URL in the case of FIG. 4A specifies "A/a1" as the address that refers to the specific address space "S1" to the VSS server 200 having the server name "vss" who supplies the resource supply service of this embodiment.

In other words, in the example shown in FIG. 4A, the page information "a1" is not searched directly but is accessed by use of the specific access space "S1". As shown in FIG. 4A, a display area for referring a personal comment that a user (or user group who is working in hypertext searching work) added on the page information is provided on the browser window. In FIG. 4A, two pieces of comment information namely "February 10: tough Competitor to product Y (hayashi)" and "February 12: amazing cost performance (kawabe)" appear as the information added to the ordinary comment "COMPANY A". These pieces of comment information mean that the user "hayashi" added the comment tough competitor to product Y" on February 10, and that the user "kawabe" added the comment "amazing cost performance" on February 12.

On the WWW browser screen shown in FIG. 4A, "S1" located on the left end of the adding comment display space shows a button for calling the input form for newly registering a comment information to the added comment data. In response to pushing of the button (namely clicking with a mouse), a dialogue box type input form as shown in FIG. 4C is obtained. In the example shown in FIG. 4C, the comment "tough competitor to product Y" is entered on the page having the address URL "http://A/a1". By clicking the "add" button after the comment is written in the comment column of the box, the written comment is correlated to the address (URL) of the page that is now being referred to and the space identification information, and registered in the space specific information management unit 206 as a comment data as shown in [Table 1]. Actually, the link comment register unit 104 prepares an input form based on the comment written in the box to request the registration.

FIG. 4B shows the page display screen displayed in response to indication (namely clicking with a mouse) of the anchor "b1" on the browser window screen shown in FIG. 4A.

As described with reference to FIG. 3A to FIG. 3D, "http://B/b1" is embedded as the page address of the link destination namely URL in the anchor "b1" on the original page of "COMPANY A", and the URL requests the page information "b1" directly to the server B. On the other hand, in the example shown in FIG. 4A, the page address that this anchor "b1" refers is replaced with "http://vss/S1?ref=B/b1". This URL character string specifies "B/b1" to the VSS server 200 having the server name "vss" who supplies the service in this embodiment by use of the specific access space "S1" as the reference destination address of the page information. In other words, the link information of the anchor "b1" is rewritten so that the page information is referred to by way of the specific access space "S1".

As the result, by accessing the anchor "b1" in the page shown in FIG. 4A, the page display shown in FIG. 4B is obtained by way of the specific access space "S1". In FIG. 4B, two comments "February 10: related to product Y (kawabe)" and "February 11: a lot of interesting features (hayashi)" appear. These comments mean that "kawabe" added the comment "related to product Y" on February 10, and that "hayashi" added the comment "a lot of interesting features" on February 11 to the page information that is being referred to.

Because, once the information searching with the added identifier "S1" of the specific access space has been carried out as described hereinabove, the link information in the page information to be accessed next is written so as to be accessed by way of the specific access space, it becomes possible to search always with succession of the information of the same specific access space in the following page searching work. In other words, a user can continue to search the specific access space of the user instead of the hypertext space unconsciously.

It is not necessary to provide a dedicated specific information display area as shown in FIG. 4A and FIG. 4B to display the comment information specific to a user (or user group who is working cooperatively in the hypertext searching work). For example, the specific information (user comment) relative to the page that the corresponding link refers may be displayed in the form of pop-up window or balloon that is opened in response to positioning of a mouse cursor on the related anchor.

Figure 5:
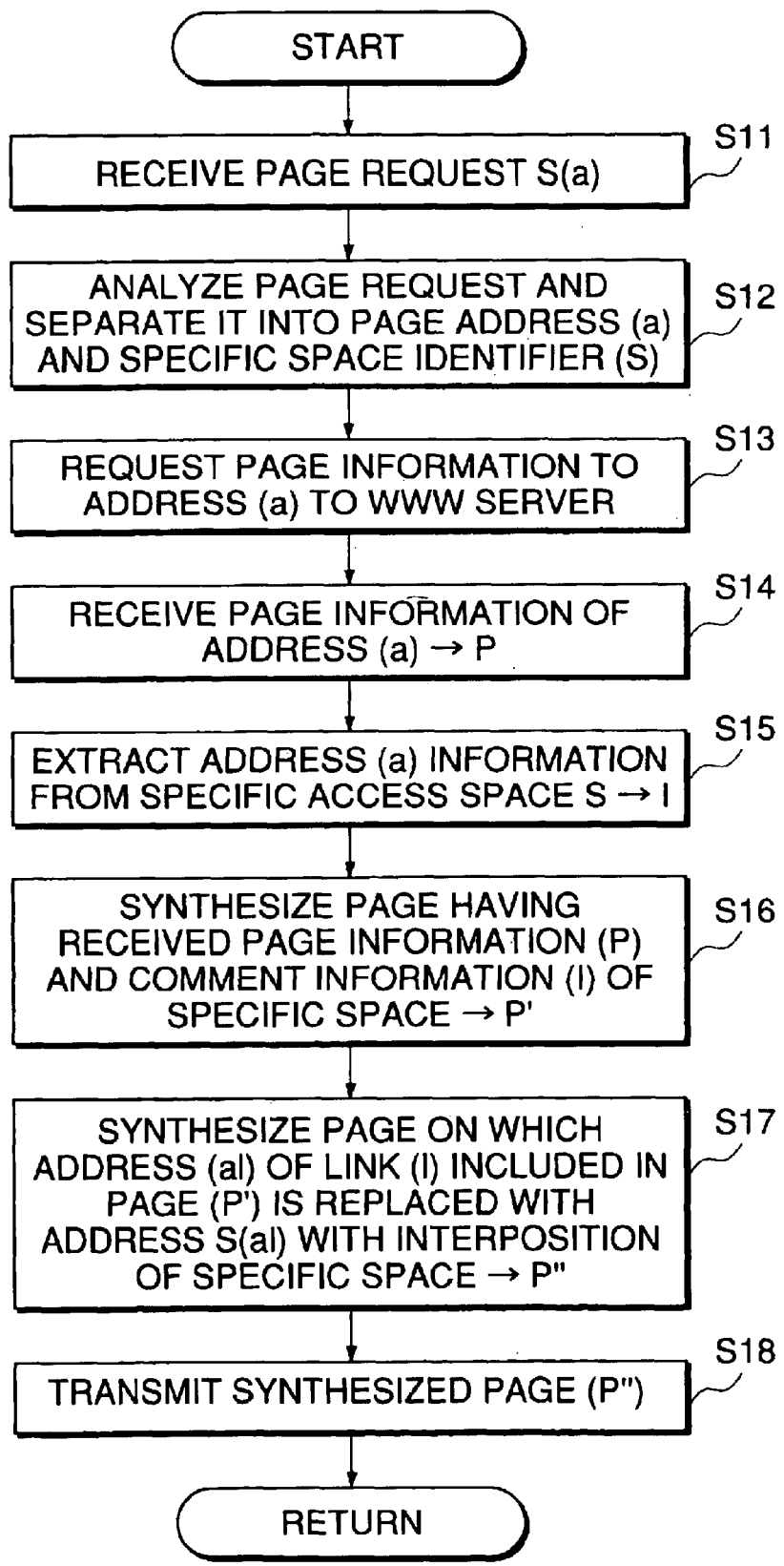
FIG. 5 is a flowchart for describing the process sequence executed by the VSS server 200 for adding comment information in the first embodiment of the present invention.

Next, the process performed by the VSS server 200 to add the comment information in this embodiment is described. In FIG. 5, the process sequence is shown in the form of flowchart. Steps of the flowchart are described herein under.

A series of process sequence starts (step S11) when the VSS server 200 receives a message S(a) of page request from the WWW client 100. In the received request message, an identification information (S) of a specific access space used by a client user (or user group) and a URL that specifies a page address (a) in the form of predetermined format are included The URL is described in the format of, for example, "http://vss/S?ref=a".

The VSS server 200 analyzes the received address namely the URL and extracts the page address (a) and the space identification information (S) (step S12).

Next, the VSS server 200 transfers the message that requests the page information to the WWW server 400 which provides the page information that is referred to by the address (a) (step S13).

The VSS server 200 acquires the page information referred to by the address (a) from the WWW server 400, and then stores it as P temporarily (step S14).

The specific access space having the space identification information (S) includes the link comment data prepared by the client user who is a requester (or user group who is working cooperatively in hypertext searching work). The VSS server 200 extracts the information relative to the address (a) from among the link comment data pieces managed by the specific access space having the space identification information (S) and stores it as I temporarily (step S15).

Next, the VSS server 200 synthesizes new page information based on the page information (P) received from the WWW server 400 and the extracted information (I) extracted from the specific access space and stores it as P' temporarily (step S16). The page P' synthesized in this step is the page to which the comment information included in the corresponding link comment data and the comment input form calling button are added on, for example, the received original page (P) (refer to FIG. 4A to FIG. 4C). This step is executed by the space specific information addition unit 205.

Furthermore, the VSS server 200 synthesizes a page (P") that is generated by replacing reference destination a1 ... of each anchor included in the page (P') synthesized in the previous step S16 with the link information S(a1), ... so as to refer by way of the specific access space S (step S17). This step is executed by the space identification information addition unit 204.

For example, in the example shown in FIG. 4A, the link information "http://A/a2" embedded in the anchor "a2" prepared on the original homepage screen of the "COMPANY A" is replaced with "http://vss/S1?ref=A/a2" so as to refer by way of the specific access space "S". Similarly, the link information "http://B/b1" embedded in the anchor "b1" prepared on the same homepage screen is replaced with "http://vss/S1?ref=B/b1" so as to refer by way of the specific access space "S".

The VSS server 200 transmits the synthesized page information (P") to the requester WWW client 100 (step S18).

According to the process routine described hereinabove, the page information (P") synthesized with addition of the specific information is given to a user instead of the page information (P) that the user has requested. The page information P" includes the link information that is suitable for hypertext searching by a user (or user group who is working cooperatively in hypertext searching work). Therefore, a user can trace on the specific access space that is different from the original hypertext space unconsciously while the user is perusing the synthesized page information P".

Second Embodiment

Figure 6:
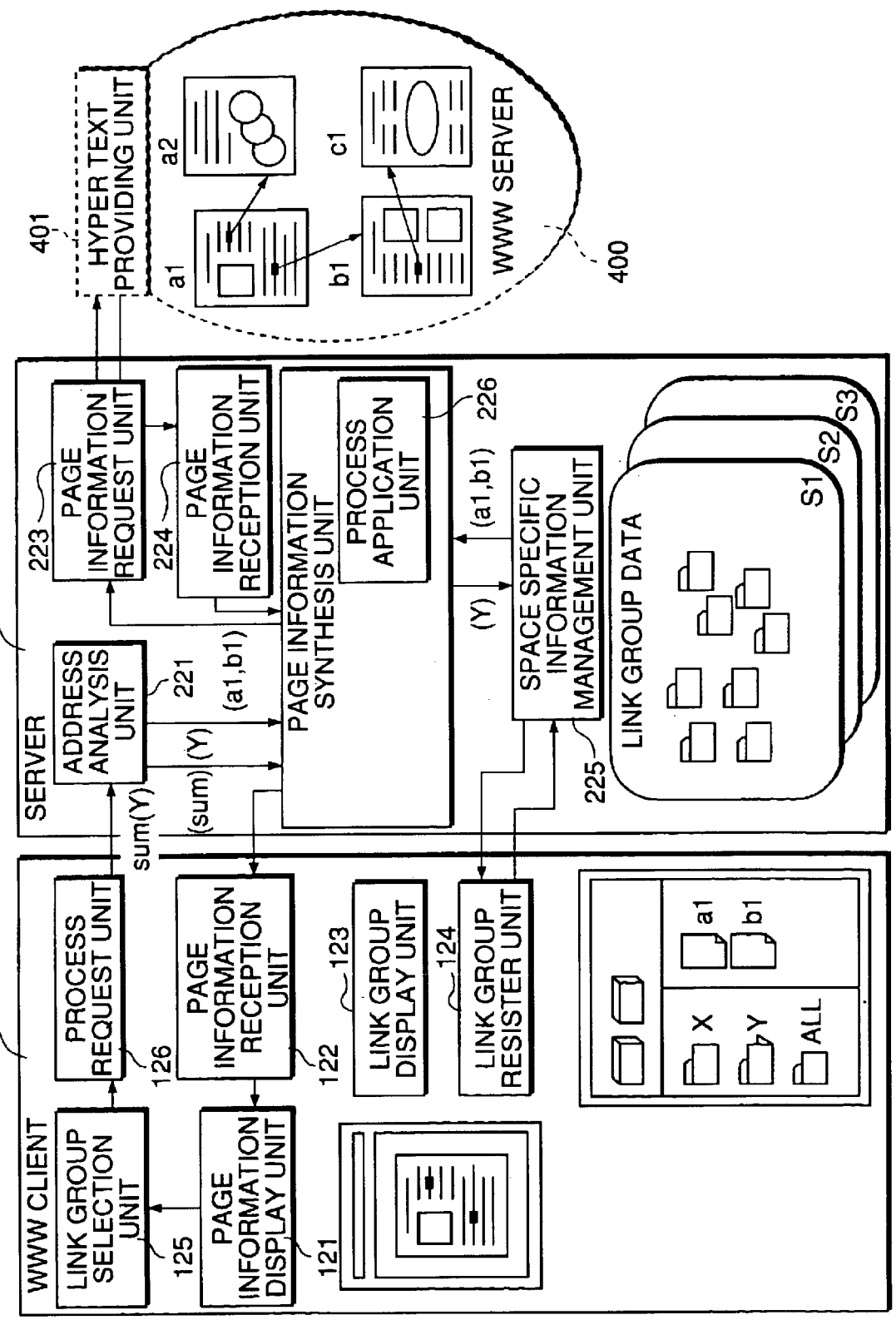
FIG. 6 is a block diagram for logically illustrating the internal structure of a VSS server 200 and a WWW client 100 in accordance with the second embodiment of the present invention.

FIG. 6 is a block diagram for illustrating logically the internal structure of the VSS server 200 and the WWW client 100 in accordance with the second embodiment of the present invention. Though the VSS server 200 and the WWW client 100 are connected with interposition of the network 10 actually, herein for the purpose of simplification, the connection according to the relation for communicating the data is described schematically. Components are described herein under.

The WWW client 100 of this embodiment includes a page information display unit 121, a page information reception unit 122, a link group display unit 123, a link group register unit 124, a link group selection unit 125, and a process request unit 126. However, such structure is logically structured by means of cooperative action of the hardware and software of a computer when the predetermined software is executed on a computer system that is an component of the WWW client 100 actually. The WWW client 100 is realized by use of the standard WWW browser for searching the hypertext information in, for example, the WWW resource space.

The page information display unit 121 analyzes the HTML document received from the WWW server 400 and fabricates page screen information, and displays it on a computer screen not shown in the drawing. The page information display unit 121 is based on the function supplied by the standard WWW browser.

The page information reception unit 122 acquires the requested page information from the WWW server 400. The page screen is fabricated based on the acquired page information, and displayed on the page information display unit 121 namely the computer screen of the WWW client 100. The page information reception unit 122 is based on the function supplied by the standard WWW browser.

The link group register unit 124 registers the link group entered by a user (or user group who is working cooperatively in hypertext searching work) and the information of the link of the member in the specific access space used by a user. "Registration" called as herein means registration in the space specific information management unit 225 (described hereinafter) of the WWW server. The link group register unit 124 describes the input form for link group registering by use of the script language provided by the standard WWW browser, and requests the registration of the link of the link group and the member to the space specific information management unit 225.

The link group display unit 123 displays the link group registered in the specific access space used by a user (or user group who is working cooperatively in hypertext searching work). The link group display unit 123 displays the list of the link group and the list of links that is the member of the selected link group by use of the script language provided by the standard WWW browser.

The link group selection unit 125 selects one link group from among link groups displayed on the link group display unit 123. The selection operation is implemented by use of the function (for example, clicking with a mouse) prepared regularly under the GUI (Graphical User Interface) environment.

The process request unit 126 requests execution of the process applied to the link group selected by the link group selection unit 125 to the VSS server 200. In the example shown in FIG. 6, the process is requested in the form that the address having combined information of the identification information of the link group and the information of the process to be applied is transmitted to the VSS server 200.

In the case that a user requests to apply the process "summary" to the link group "Y" selected by the link group selection unit 125, the address sum (Y) having combined information of the identification information of the link group and the information of the process to be applied is issued from the process request unit 126 as shown in FIG. 6. The process summary referred to herein means the synthesis process that the reduced screen, heading, and reference link of the page information referred to by links included in the link group are displayed to thereby prepare the summaries of the pages and then the summaries are synthesized.

On the other hand, the VSS server 200 includes an address analysis unit 221, a page information synthesis unit 222, a page information request unit 223, a page information reception unit 224, and a space specific information management unit 225. However, such structure is logically structured by means of cooperative action of the hardware and software of a computer when the predetermined software is executed on a computer system that is an component of the VSS server 200 actually. Components are described herein under.

The address analysis unit 221 analyzes the address included in the request message from the WWW client 100, separates the address into the name of process and the identification information of the link group, and transfers them to the page information synthesis unit 222. In the example shown in FIG. 6, the name of process "sum" and the name of the selected link group "Y" are transferred to the page information synthesis unit 222.

The page information synthesis unit 222 synthesizes a new page information based on the material of plural pieces of page information, and returns the result to the WWW client 100. In detail, the page information synthesis unit 222 receives the identifier of the link group and then searches the link group data stored in the space specific information management unit 225, and acquires the list of the link that is the member of the link group having the corresponding group identifier. The page information synthesis unit 222 further sends the request to the WWW server 400 having the page information referred to by the acquired link, receives the page information, and applies the specified process to the page information. The series of processes is implemented by means of cooperative action performed by sub modules namely a process application unit 226 described herein under, the page information request unit 223, the page information reception unit 224, and space specific information management unit 225.

The process application unit 226 applies the specified process to the member of the received link group namely the list of the page information. The process to be applied are "summary" and "merge".

The page information request unit 223 requests the WWW server 400 which holds the corresponding page to transfer the page information located on the specified address.

The page information reception unit 224 acquires the requested page information from the WWW server 400.

The space specific information management unit 225 manages the link group entered by a user (or user group who is working cooperatively in hypertext searching work) and the information of the member of the link group as the link group data to which the group identifier is added. The link group data in the format described in the script language provided by the standard WWW browser is sent from the link group register unit 124 of the WWW client 100 (described hereinabove).

In this embodiment, the space specific information management unit 225 prepares the specific access space for each user (or user group who is working cooperatively in hypertext searching work) and manages each specific access space by means of the space identification information. In the example shown in FIG. 6, three specific access spaces namely "S1", "S2", and "S3" are prepared. The space specific information management unit 225 saves the link group data received from the user namely the WWW client 100 that is correlated to the link group identifier in the corresponding specific access space. The space specific information management unit 225 takes out the link group data of the specific access space corresponding to the specified link group identifier in response to the request from the page information synthesis unit 222.

[Table 2] shown herein under shows an example of the schematic structure of the link group data managed in the space specific information management unit 225. This data structure defines the specific access space "S1".

TABLE 2

| gid | process | links |
|---|---|---|
| X | | http://A/a2 |
| | | http://C/c1 |
| Y | | http://A/a1 |
| | | http://B/b1 |
| summary of Y | summary | http://A/a1 |
| | | http://B/b1 |

TABLE 2-continued

| gid | process | links |
|---|---|---|
| A11 | | http://vss/summary?gid=vss/X |
| | | http://vss/summary?gid=vss/Y |

*gid: the identifier of the link group registered. One entry is prepared for each gid.
*process: the process name that is default-applied to the corresponding link group. By specifying the process, the link group is used as process parts.
*links: links describe the address (URL) to the reference information included in the link group. Arbitrary number of addresses is written in one entry.

In the example shown in FIG. 6, the link group "Y" that is requested to be processed includes the link information to two pages namely "a1" and "b1". The page information synthesis unit 222 receives the link member list (a1, b1) from the space specific information management unit 225 and then transfers it to the page information request unit 223. Next, the page information request unit 223 requests the corresponding WWW server 400 to transfer this page information. The hypertext providing unit 401 of the WWW server 400 returns the hypertexts corresponding to respective addresses (a1, b1) as the page information in response to the request. The process application unit 226 receives the page information "a1" and "b1" by way of the page information reception unit 224 and then applies the requested process "summary" to each page information, and synthesizes a new page information.

Though the VSS server 200 of this embodiment is a server for preparing the specific access space for each user (or user group who is working cooperatively in hypertext searching work), for example, the VSS server 200 may be structured by use of the server disclosed in Japanese Published Unexamined Patent Application No. Hei 10-222416 "Hypertext Management Apparatus", which has been assigned to the applicant of the present invention. The server described in the publication interprets the address and procedure of the hypertext included in the request message, and transmits the page information to which the procedure has been applied. For the detail of the structure and process operation of the server, the Japanese Published Unexamined Patent Application is referred to.

Because, in the case that the WWW client 100 and the VSS server 200 are structured in the form as shown in FIG. 6, both synthesized virtual page display and the original page information used for the virtual page as material are accessed according to the URL, it is not necessary to provide two separate units for displaying respective pages.

FIGS. 7A to 7D show the synthesis operation of the virtual page by means of cooperative action of the VSS server 200 and the WWW client 100 in accordance with this embodiment.

Figure 7D:
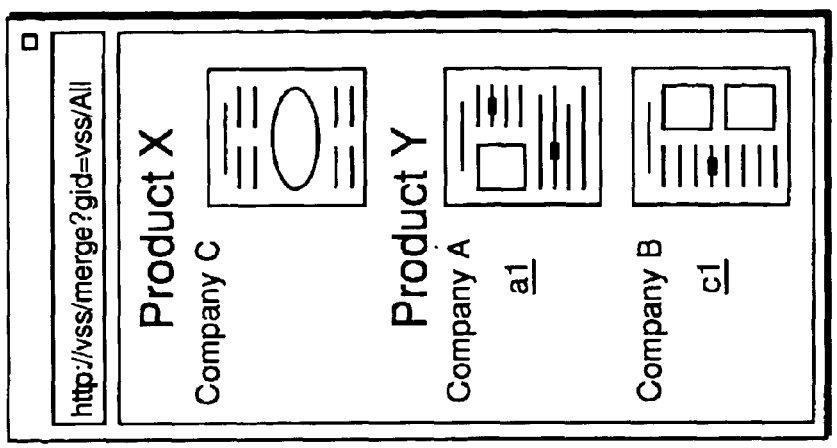
FIG. 7A to FIG. 7D illustrate the synthesis process of a virtual page by means of the VSS server 200 and the WWW client 100 in accordance with the second embodiment of the present invention.
Figure 7C:
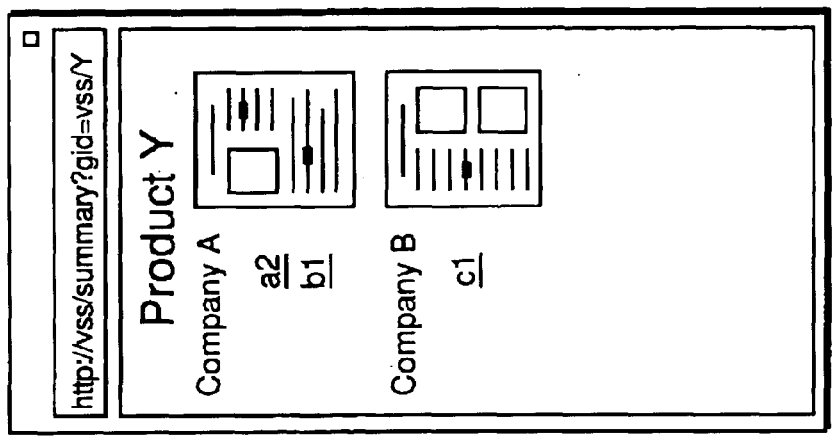
Figure 7A:
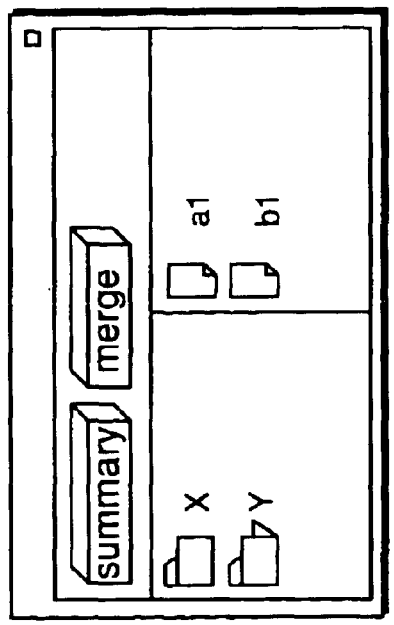

FIG. 7A is a window display screen for displaying registered link groups, and displayed on the computer screen of the WWW client 100 side. The window has the right and left columns, registered link groups are displayed on the left column, and link members included in a link group selected from among link groups listed on the left column are displayed on the right column in the form of table. In the example shown in FIG. 7A, two registered link groups "X" and "Y" are displayed on the left column. The underline of the link group name "Y" indicates that this link group is being selected currently. Links "a1" and "b1" of the member included in the link group "Y" are displayed on the right column.

Two button "summary" and "merge" are disposed above the columns for displaying the link group and link member on the window display screen shown in FIG. 7A. The buttons indicate the process that is allowable to be applied, and a client can indicate to apply the process to the selected link group by pushing a desired button (namely clicking of a mouse). The result obtained by applying the process to the group is displayed on, for example, the computer screen of the WWW client 100 side.

FIG. 7C shows the screen that is showing the result obtained by applying the process when a user pushes the button "summary" on the window display screen shown in FIG. 7A. The process "summary" referred to herein indicates a process for creating page summaries, each of which includes the thumbnail of the page, title of the page, and links referenced in the page, and synthesizing them into one page. The process request is realized by transferring the request message including the address namely URL "http://vss/summary?gid=vss/Y" to the VSS server 200. Herein, "vss" in the URL character string is the name of the server 200 who provides the service of the process "summary".

A virtual page image formed by applying summary to the page information of the link destination included in the link group is displayed on the summary application screen as shown in FIG. 7C. This image includes the display of respective thumbnails, titles, and reference links of the link members included in the link group "Y" namely "a1" and "b1".

Figure 7B:
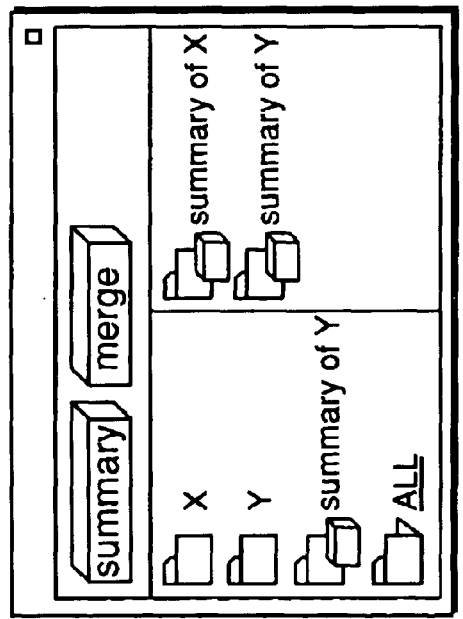

Furthermore, link groups "summary (Y)" and "ALL" are displayed on the left column of the table display window screen of the link group and link member shown in FIG. 7B. The data structure of the link group data displayed on FIG. 7B is described with reference to [Table 2] hereinabove.

The process "summary" to the link group "Y" is default-specified to the link group "summary of Y". In other words, the default process is specified as the process parts. In this case, the icon of the link group expresses that the link group is specified as the process parts. A user can execute the predetermined process without selecting the process only by clicking the process component icon on the link group display window. In other words, the operation is simple in comparison with the two-step input that involves link group selection and operation of the process button.

The underline of the link group mane "ALL" displayed on the left column in FIG. 7B indicates that this link group is being selected currently. This link group "ALL" includes process parts "summary of X" and "summary of Y" as the link member, and respective icons that indicate these link members are displayed on the right column. In the case where the member includes the link member to which the process is set, process parts of respective members are executed first, and then the process is applied to the whole link group.

FIG. 7D shows the result obtained by applying the process "merge" when the button "merge" is pushed on the window display screen shown in FIG. 7B. The process "merge" referred to herein means the process for simply synthesizing respective pages included in the link members. In the example shown in FIG. 7D, "merge" process is applied to the selected link group "ALL". Because members included in the group "ALL" are "summary of X" and "summary of Y" formed as process parts of the link groups X and Y, in the case that the process is applied to the group "ALL", the process is applied to groups "X" and "Y" respectively first to prepare the summary information, and then the synthesis process of the whole group is executed.

On the "merge" application screen shown in FIG. 7D, one virtual page image synthesized from the synthesis page image obtained by applying the process "summary" to the page information "c1" of the link destination included in the link group "X" and the image obtained by applying the process "summary" to the page information a1 and b1 of the respective link destinations included in the link group "Y" is displayed on the screen.

Figure 8:
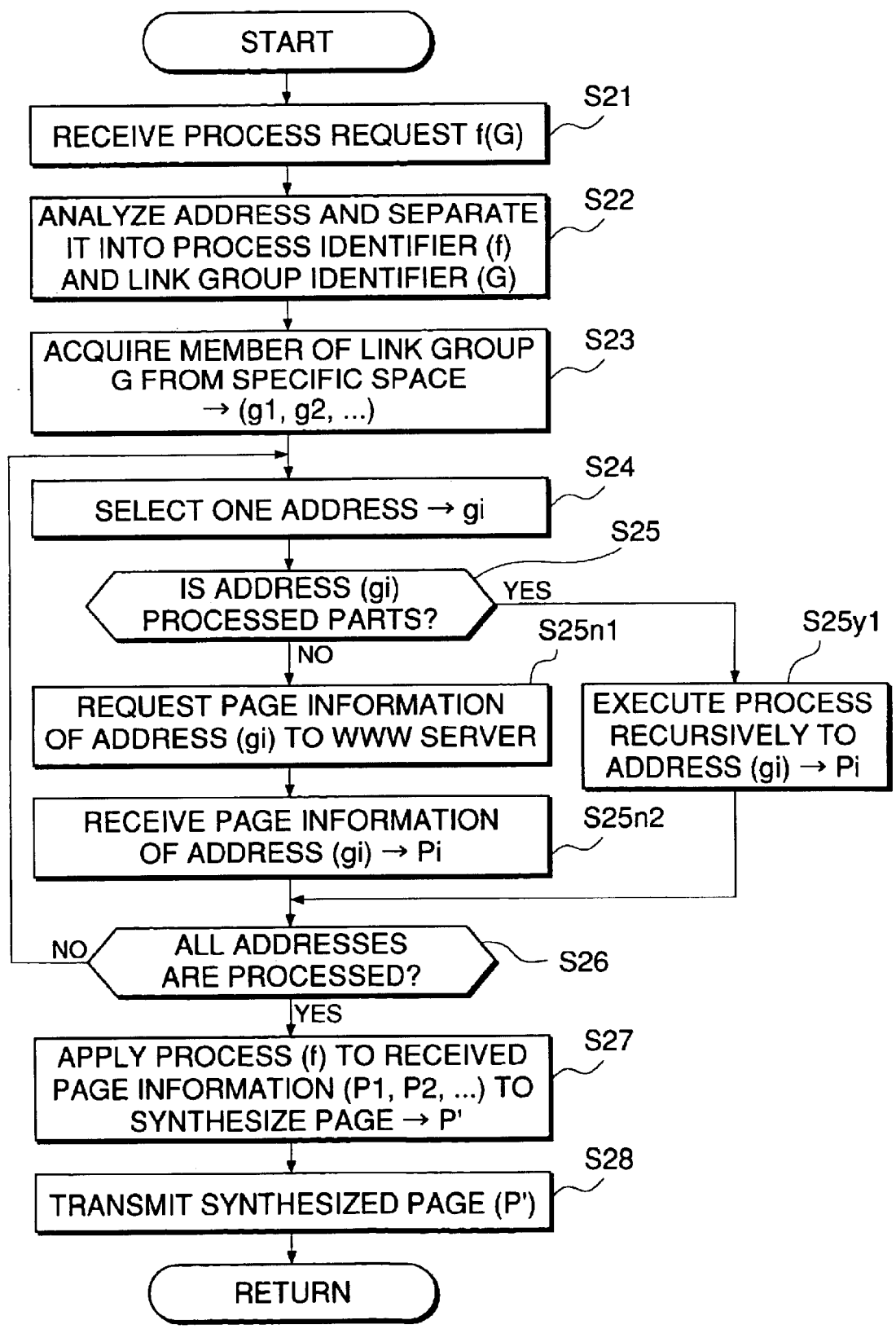
FIG. 8 is a flowchart for describing the process sequence executed by the VSS server 200 for applying the process to the link group in the second embodiment of the present invention.

Next, the process to be executed by the VSS server 200 for executing the process to the link member included in the link group in this embodiment is described. FIG. 8 shows the process sequence in the form of flowchart. Steps in the flowchart are described herein under.

When the VSS server 200 receives a message of process request f(G) from the WWW client 100, the series of process sequence starts (step S21). The received request massage includes identification information of the process(f) from the WWW client 100 and a URL described in the predetermined format that specifies the identification information of the link group (G) to which the process is to be applied. The URL is described in the format, for example, "http://vss/f?gid=G".

The VSS server 200 analyzes the received process request message and extracts the process identifier (f) and the link group identifier (G) (step S22).

Next, the VSS server 200 acquires link members included in the link group (G) from the specific access space namely the link group data managed in the space specific information management unit 225 (step S23). The acquired link members are designated temporarily as (g1, g2, . . . ).

One link namely an address is selected from among the taken out link members (g1, g2, . . . ) (step S24). The selected address is assumed as gi.

Next, in step S25, whether the taken out address gi is a process parts or not, namely whether this address includes the information for specifying the process or not, is checked.

If the address gi is a process parts, then the sequence proceeds to step S25y1 to execute the process to the address gi recursively. The process parts obtained by applying the process to gi is held as the page information Pi.

On the other hand, if the address gi is not a process parts, then the sequence proceeds to step S25n1, and the VSS server 200 requests for the page information referred to by the address gi to the WWW server 400 who holds the corresponding page.

The VSS server 200 receives the page information referred to by the address gi from the WWW server 400, and holds it as the page information Pi (step S25n2).

Next, in step S26, whether the process is completed or not with all the link members namely addresses included in the link group (G) is checked. If an unprocessed address remains, the sequence returns to step S24, and the same process is repeated to the unprocessed address.

On the other hand, if the process is completed covering all the members, the sequence proceeds to step S27, and the specified process (f) is applied to the received page information (P1, P2, . . . ) to synthesize a virtual page. The synthesized virtual page is held as the page information P1.

Finally, the VSS server 200 transmits the synthesized page information P' to the WWW client 100 which is the requester (step S28), and thus the whole process sequence is completed.

The link group is, in summary, a specific access space that specifies the link searching path specific to a user (or user group who is working cooperatively in hypertext searching work). According to the above-mentioned process routine, the page information synthesized by applying the process specific to the link member and link group is given to a user instead of the page information itself referred to by links included in the link group requested by the user. In other words, the specific process can be applied simply. The command for page synthesis process involving multi-stages can be implemented easily.

Next, the process sequence for registering the link group is described. FIG. 9A to FIG. 9G show the link group registration display window screen for registering the link group. All the window screens shown in FIG. 9A to FIG. 9G are displayed on the computer screen of the WWW client 100 by the link group register unit 124 and the link group display unit 123.

Figure 9A:
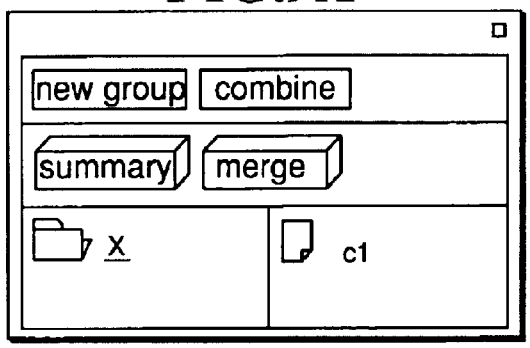
FIG. 9A to FIG. 9G illustrate a computer screen on the WWW client 100 for registering the link group in the second embodiment of the present invention.

FIG. 9A is a link group display window screen for displaying the link group that is registered currently. In the example shown in FIG. 9A, only the link group "X" is registered in the specific access space used by the user, and only the folder icon corresponding to the group "X" appears on the left column of the window screen.

The underline of the link group name "X" indicates that this link group X is being selected currently, and the list of the link member included in the link group "X" is displayed on the right column of the window screen. In the example shown in FIG. 9A, only one link "c1" is registered in the link group "X".

Buttons for specifying a registration process of the link group are disposed in the top column of the link group display window. In the example shown in FIG. 9A to FIG. 9G, two buttons "new group" and "combine" are disposed. "new group" means that a new link group is prepared, and "combine" means that the process to be applied to the link group is combined with the link group (namely making a process parts). A user pushes a button that displays the desired process on the GUI screen as described herein (namely clicking with a mouse) to request for execution of the process corresponding to the button to the system. Actually, the request is converted to input form by use of the script language provided by the standard WWW browser in the link group register unit 124 in response to the operation performed on the GUI, and the registration process is executed to the space specific information management unit 225.

Figure 9B:
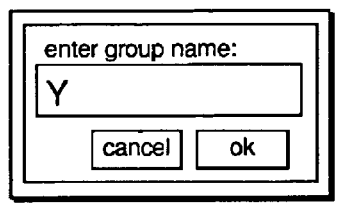

When the button "new group" is clicked on the window screen shown in FIG. 9A, an input dialogue for registering the link group as shown in FIG. 9B is pop-up displayed. This dialogue box prompts the input of the link group name to be prepared newly, in the example shown in FIG. 9B. "Y" is entered as the link group name.

Figure 9C:
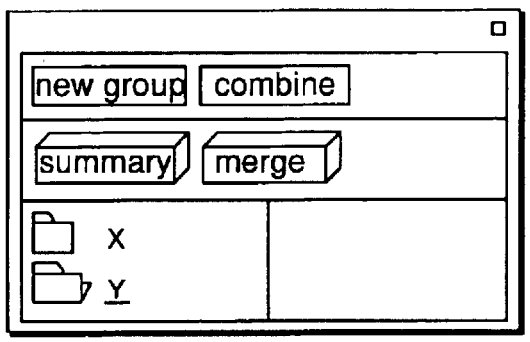

When "OK" button in the box is clicked after the link group name is entered on the dialogue box shown in FIG. 9B, the input of the link group name is finalized, and then the display content of the link group display window is updated as shown in FIG. 9C. In detail, as shown in FIG. 9C, the folder icon for representing the link group "Y" appears on the left column, and the folder icon "Y" is brought into selection status (underline is added under the icon name "Y"). However, there is no link member and the right column is blank because it is immediately after the opening of the link group "Y".

Figure 9D:
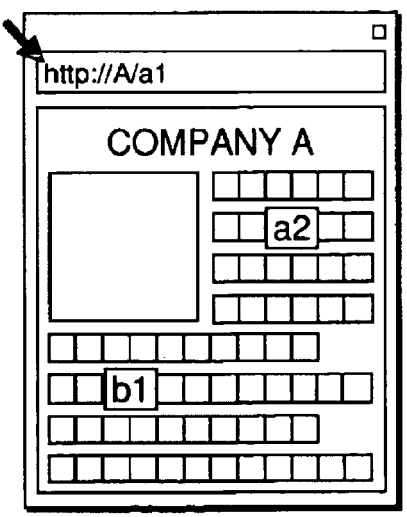
Figure 9E:
Figure 9F:
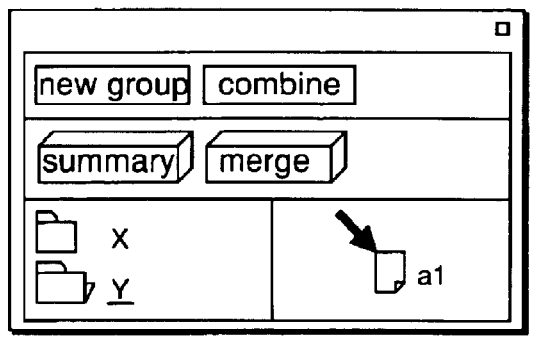

A series of operations for registering the link information to refer the page to the link group is shown schematically in FIG. 9D, FIG. 9E, and FIG. 9F. The registration operation to the group is implemented by so-called drag-and-drop operation under the GUI (Graphical User Interface) environment. In detail, a user can add the desired link information as a link member by means of a method that the desired link information is pointed with a mouse cursor on the WWW browser window displayed on the computer screen of the WWW client 100 (refer to FIG. 9D), dragged (refer to FIG. 9E), and dropped on the right column of the link group display window (refer to FIG. 9F). In the example shown in FIG. 9, the link information for referring to the page information "a1" is added as a link member of the link group "Y".

Figure 9G:
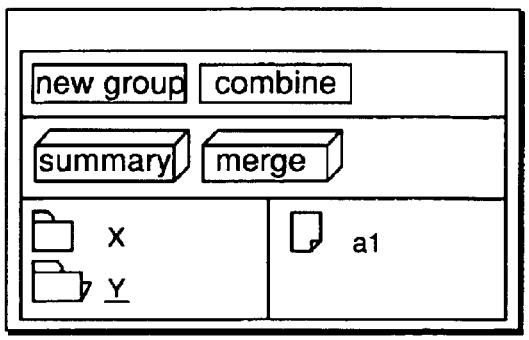

The link group register unit 124 describes the input form for registering the link member by use of the script language provided by the standard WWW browser and requests for registration to the space specific information management unit 225 in response to the drag-and-drop operation on the GUI screen as described hereinabove. When the registration of the link member to the link group data is finalized, the screen of the link group display window is updated. In other words, as shown in FIG. 9G, an icon that represents the new link member "a1" appears on the right column in which the selected link group "Y" is shown.

Figure 10A:
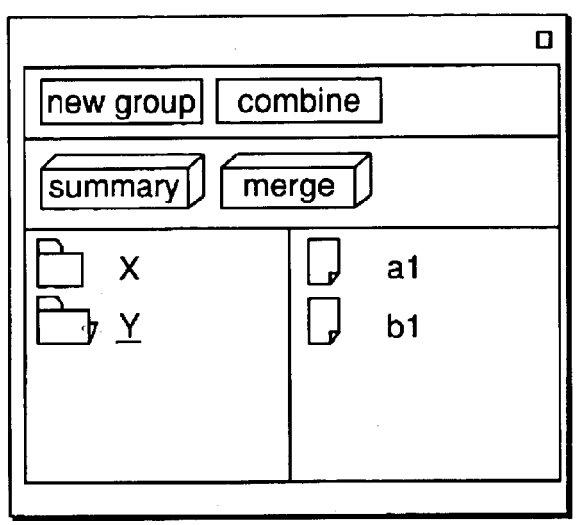
FIG. 10A and FIG. 10B illustrate a link group display window screen for synthesizing the link in the second embodiment of the present invention.
Figure 10B:
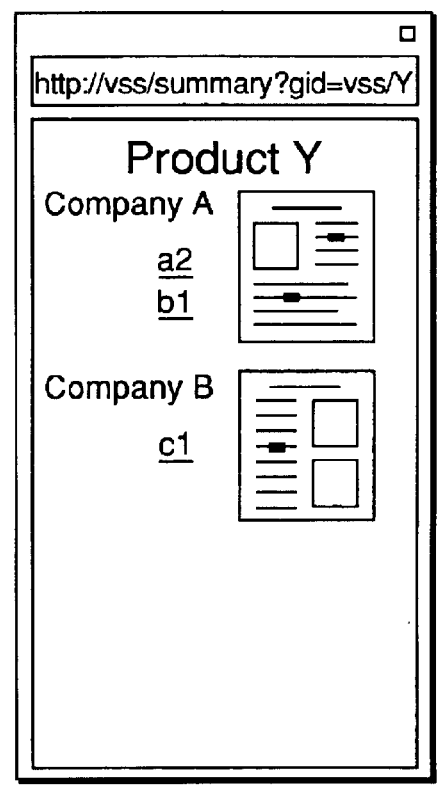

Next, the process sequence for synthesizing links included in the link group together is described. FIG. 10A and FIG. 10B show the link group display window screen for synthesizing the link. FIG. 10A and FIG. 10B are displayed on the computer screen of the WWW client 100 by means of the link group register unit 124 and the link group display unit 123.

In FIG. 10A, "Y" is selected from among link groups "X" and "Y" registered in the specific access space. Icons that stand for respective pages "a1" and "b1" of link members registered in the link group "Y" are displayed on the right column of the window.

In the link group display window, buttons for specifying the process applicable to the link group are provided in the second top column. In the example shown in FIG. 10A, two buttons "summary" and "merge" are provided. The "summary" means a process for preparing and synthesizing the summary of each piece of page information by displaying the thumbnail, title, and reference link of the page referred to by each link included in the link group, and on the other hand, "merge" means a process for simply synthesizing pages together.

A user can request for execution of the process to the system by pushing (namely clicking with a mouse) the button that displays the desired process under the GUI environment. In other words, the process request unit 126 requests for the process performed to the link group by transmitting the address formed by combining the identification information of the link group and the information of the process to be applied to the VSS server 200.

Application of the process "summary" to the link group "Y" can be requested by clicking the button "summary" when the link group "Y" is being selected as shown in FIG. 10A. The request for the process is implemented by transmitting the address "http://vss/summary?gid=vss/Y" to the VSS server 200 which supplies the service in accordance with this embodiment actually.

FIG. 10B shows a display screen of the result obtained by applying the process "summary" to the link group "Y". This display screen is a virtual page screen obtained by performing a process in which the thumbnail, title, and reference link of the page referred to by the links "a1" and "b1" included in the link group "Y" are displayed to prepare respective summaries of page information, and the virtual page screen is synthesized from these summaries.

Next, the process sequence for registering the process parts to the link group is described. FIG. 11A to FIG. 11D show a link group display window screen for synthesizing a link. FIG. 11A to FIG. 11D are displayed on the computer screen of the WWW client 100 by means of the link group register unit 124 and the link group display unit 123.

Figure 11A:
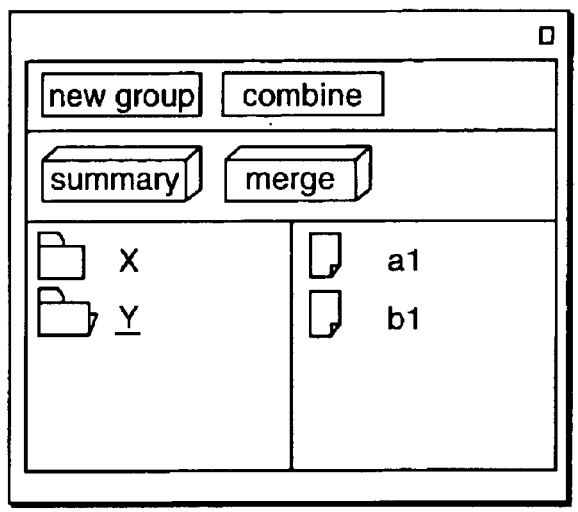
FIG. 11A to FIG. 11D illustrate a link group display window screen for registering the process parts to the link group in the second embodiment of the present invention.

FIG. 11A shows the link group "Y" registered in the specific access space that is being selected. Icons that stand for respective pages "a1" and "b1" of link members registered in the link group "Y" are displayed on the right column of the window.

When a user clicks "combine" button in the situation as shown in FIG. 11A, the dialogue box for specifying the process to be default-applied to the link group "Y" that is being selected is pop-up displayed.

Figure 11B:
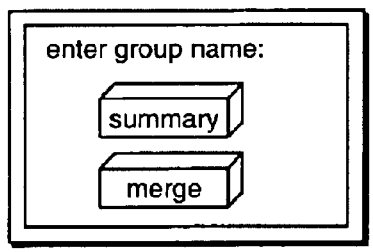
Figure 11C:
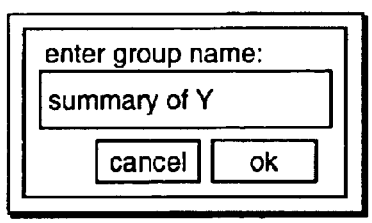

FIG. 11B shows the process parts dialogue box. When "summary" is selected on this dialogue box, the dialogue box shown in FIG. 11C is popped up in response to the selection operation to prompt the input of the link group name. In the example shown in FIG. 1C, a user enters the name "summary of Y" as text.

According to the user input of the registration of the process parts as described hereinabove, the group register unit 124 describes the input form for process parts registration by use of the script language provided by the standard WWW browser and requests for registration to the space specific information management unit 225. As the result, the link group "summary of Y" that specifies "summary" as the default process to the link group "Y" namely the process parts is prepared.

Figure 11D:
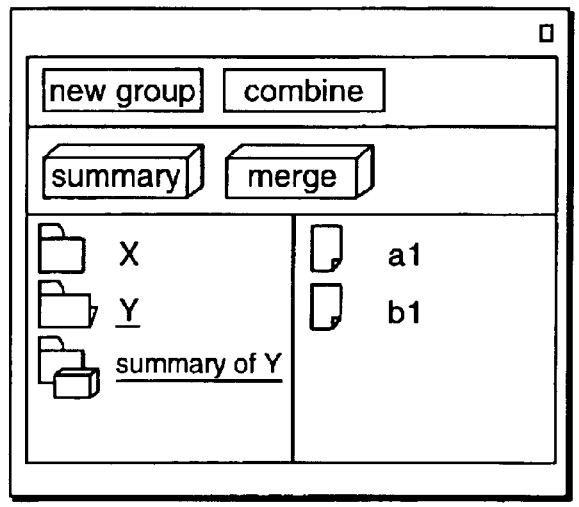

When the sequence for preparing the process parts is completed, the content of the link group display window is updated. FIG. 11D shows the updated window, a folder icon "summary of Y" obtained by converting the link group "Y" to a process parts appears on the left column of the window. Only by clicking the process component icon, the predetermined process is executed without selection of the process. It should be understood that the user operation is very simple in comparison with two-step operation in which first the link group is selected and then the process that is wanted to be applied is specified.

Figure 12A:
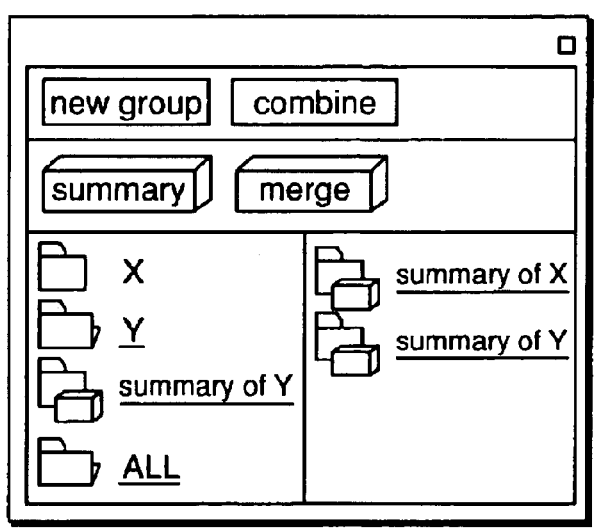
FIG. 12A and FIG. 12B illustrate the application of the recursive process to the link group in the second embodiment of the present invention.

In the link group display window shown in FIG. 12A, a link group having the name "ALL" is additionally displayed. In FIG. 12A, the underline of the link group name "ALL" shows that the link group "ALL" is selected. Therefore, on the right column of the window, the process parts folder icons "summary of X" and "summary of Y" are displayed as members of the link group "ALL".

In the case that a link group has link groups to which the processes are set as link members, first the process is applied to process parts that are the members, and then the process is applied to the whole link group. In other words, when the process is applied to the link group "ALL", first the process is applied to process parts members "summary of X" and "summary of Y", and then the specified process is applied to "ALL".

Figure 12B:
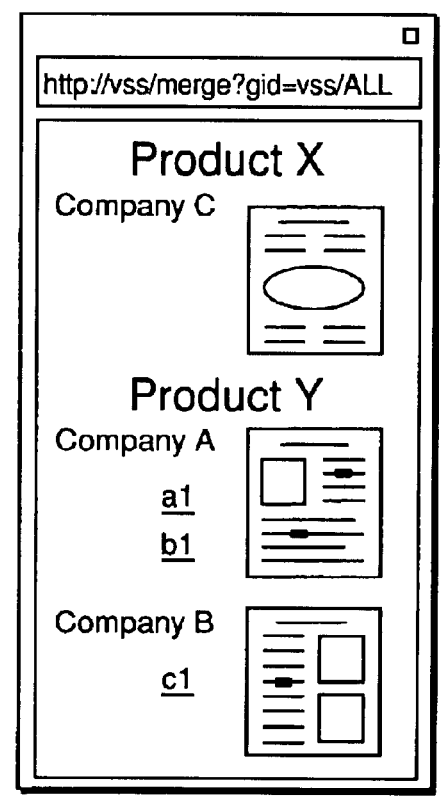

FIG. 12B shows the result obtained when the button "merge" is pushed in the situation that the link group "ALL" is being selected as shown in FIG. 12A. "merge" process is a process simply for combining pages. In this case, first the summary information of the link members "X" and "Y" obtained by applying the process to process parts of members included in the link group "ALL" is prepared, and then the merge process is applied to the summary information.

FIG. 13A to FIG. 13D show addition of the link information included in the searched hypertext as a member of the link group. Under the GUI environment, a user operates drag-and-drop on the WWW browser screen to thereby register the desired link information as a member of the link group.

Figure 13A:
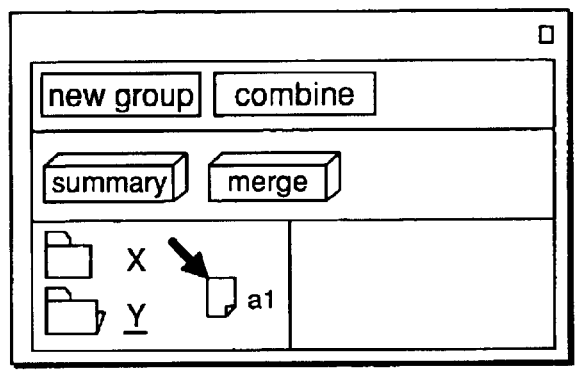
FIG. 13A to FIG. 13D illustrate the process to add the link information included in the searched hypertext as a member of the link group.
Figure 13B:
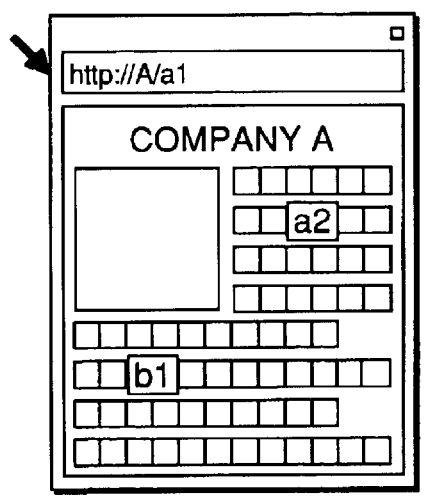
Figure 13D:
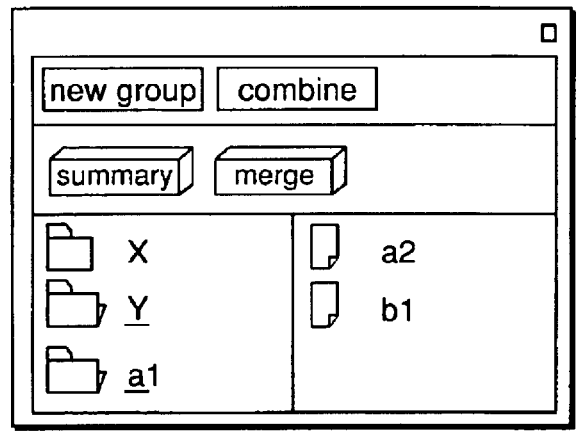
Figure 13C:

For example, as shown in FIG. 13B, now the WWW browser window of the page information "a1" is displayed by means of the page information display unit 121. A user selects, for example, the WWW browser window, and drags the link of the display page "a1" (refer to FIG. F13C) and drops it on the left column of the link group display window shown in FIG. 13A.

The link group register unit 124 describes the input form for registering the link member by use of the script language provided by the standard WWW browser and requests for registration to the space specific information management unit 225 in response to the drag-and-drop operation on the GUI screen as described hereinabove.

The space specific information management unit 225 has a sub module namely the hypertext analysis unit (not shown in the drawing). The hypertext analysis unit analyzes the page information "a1" referred to by the link, extracts all the link information included in the page, and registers the link group "a1" having the extracted link information in the member newly. Based on the function of the hypertext analysis unit as described hereinabove, it is possible to prepare a link group by use of a link collection in the hypertext space or a link collection generated by searching.

When the new preparation of the link group and registration of the link member to the link group are finalized, the screen of the link group display window is updated. In detail, as shown in FIG. 13B, a folder icon of the link group "a1" having the link information "a2" and "b1" included in the page information "a1" as the link member appears on the left column of the link group display window.

[Supplement]

The present invention is described in detail hereinabove with reference to the specific embodiments. However, it is apparent that a person skilled in the art can modify or substitute the embodiments without departing from the scope of the present invention.

For example, it is required to transfer the space identification information of the specific access space to secure the succession of the specific access space from the VSS server 200 to the WWW client 100. In the above-mentioned first embodiment, transfer of the space identification information of the specific access space is made possible by rewriting the address namely URL, but a different method may be used. For example, architectures described herein under may be used.

(1) The architecture in which a service space that is being referred to is recorded in a data relaying system called as proxy.
(2) The architecture in which a client holds the information of the specific space.
(3) The architecture in which a special tag is embedded in the body of the hypertext instead of rewriting of URL.
(4) The architecture in which the identification information of the service space is exchanged by means of transmission/reception protocol.

The process and the identifier of the link group are transferred as the address when the apparently specified link collection is grouped and a user apparently applies the process in the above-mentioned second embodiment, but a different method may be used. For example, architectures described herein under may be used.

(1) The architecture in which the link group is determined dynamically by searching with a given key instead of static determination of the link group.
(2) The architecture in which a user selects dialogically the link group to thereby determine dynamically instead of static determination of the link group.

A method in which the link group that includes the link included in the hypertext searching history by a user (or user group who is working cooperatively in hypertext searching work) is automatically registered as the link group may be used as the modified example of the second embodiment.

In summary, the present invention is disclosed in the form of an exemplified embodiment, and the present invention should not be interpreted limitedly. To judge the scope of the present invention, the claims described hereinafter should be referred to.

As described hereinbefore, according to the present invention, an excellent apparatus and a method that are capable of adding the specific information to a user (or user group who is working cooperatively in hypertext searching work) or simply applying the specific process in the hypertext space having link relation between one or more hypertexts provided by one or more servers are provided.

According to the present invention, an excellent apparatus and a method that are capable of providing the specific access space that specifies the link search path for adding the specific information to a user (or user group who is working cooperatively in hypertext searching work) or simply applying the specific process are provided.

According to the present invention, an excellent apparatus and a method that are capable of selectively specifying the specific access space to a user including specified personal users or specified user groups in the hypertext space are provided.

According to the present invention, an excellent apparatus and a method that are capable of providing the specific access space to the range determined dynamically by a user who searches in the hypertext space are provided.

According to the present invention, an excellent apparatus and a method that are capable of taking out the necessary information for the link group specified by a user and performing the process for synthesizing a new page easily are provided.

According to the present invention, an excellent apparatus and a method that are capable of performing indication of the multi-stage synthesis process of the page easily are provided.

What is claimed is:

1. An apparatus for providing a specific access space that specifies a path specific to a user who searches a hyperlink in a hypertext space composed of mutual link relation between one or more hypertexts provided by one or more servers, comprising:
   - a space specific information management unit that adds space identification information to specific information for each user associated with the specific access space relative to page information and manages in correlation with a reference to the page information;
   - an analysis unit that interprets a page request from the user and extracts a reference of requested page information and the space identification information;
   - a page information request unit that requests the page information referred to by the reference extracted by the analysis unit to a server which provides the hypertext;
   - a page information reception unit that receives the page information from the server which provides the hypertext;
   - a specific information addition unit that takes the specific information out of the space specific information management unit corresponding to the space identification information extracted by the analysis unit and adds the specific information of the received page information to the page information; and
   - a space identification information addition unit that replaces the reference included in the received page information with the corresponding space identification information,
   wherein page information synthesized by the specific information addition unit and the space identification information addition unit is provided to the user instead of an original page information referred to by a reference specified by the user.

2. An apparatus for providing a specific access space that specifies a path specific to a user who searches a hyperlink in a hypertext space composed of mutual link relation between one or more hypertexts provided by one or more servers, comprising:
   - a space specific information management unit that receives, from a user, specific information for page information that is a constituent of the hypertext and manages it in correlation with a reference to the page information by space identification information;
   - an analysis unit that interprets a page request from the user and extracts a reference of the page information and the space identification information;
   - a page information request unit that requests the page information referred to by the reference extracted by the analysis unit to a server which provides the hypertext;
   - a page information reception unit that receives the requested page information from the server which provides the hypertext;
   - a specific information addition unit that takes the specific information corresponding to the space identification information extracted by the analysis unit out of the space specific information management unit and adds the specific information to the corresponding received page information; and
   - a space identification information addition unit that replaces a reference included in the received page information with the corresponding space identification information,
   wherein the page information synthesized by the specific information addition unit and the space identification information addition unit is provided to the user instead of an original page information referred to by a reference specified by the user.

3. An apparatus for providing a specific access space that specifies a specific path to a user who searches a hyperlink in a hypertext space composed of mutual link relation between one or more hypertexts provided by one or more servers, comprising:
   - a space specific information management unit that groups one or more links that refer to page information and manages the grouped links as link group data to which a link group identifier is added;
   - an analysis unit that interprets a process request from the user and extracts a requested link group identifier and a process to be applied;
   - a unit that takes the link group data corresponding to the link group identifier extracted by the analysis unit out of the space specific information management unit;
   - a page information request unit that requests page information referred to by each link included in the extracted link group data to a server which provides the hypertext;
   - a page information reception unit that receives the page information from the server which provides the hypertext; and
   - a page information synthesis unit that applies the process extracted by the analysis unit to a whole page information referred to by each link included in the link group to synthesize a virtual page, wherein information of the virtual page is provided to the user instead of original page information referred to by each link included in the link group specified by the user.

4. The apparatus as claimed in claim 3, further comprising:
a unit that receives a user's instruction about registration of contents of the link group data, such as the link groups, each link included in each link group, and the process to be applied to each link group or each link included in each link group.

5. The apparatus as claimed in claim 3, wherein
the space specific information management unit manages the process to be applied to the link included in the link group in correlation with the link, and the page information synthesis unit applies the process correlated to the link to the page information referred to by the link and then applies the process requested for the link group to the whole link group.

6. The apparatus as claimed in claim 3, further comprising:
a unit that converts the link group or the link correlated to the process to be applied into process component and holds the component.

7. The apparatus as claimed in claim 6, further comprising:
a process component display unit that shows the user the link group or the link that has been converted into the process component as a process component icon.

8. The apparatus as claimed in claim 3, further comprising:
a hypertext analysis unit that analyzes the page information referred to by the link selected by the user and registers the link group having the link that is included in the page information.

9. A method for providing a specific access space that specifies a path specific to a user who searches a hyperlink in a hypertext space composed of mutual link relation between one or more hypertexts provided by one or more servers, the specific access space being composed of space specific information for each user associated with the specific access space, and each piece of the space specific information being identifiable by means of space identification information and specific information of the user relative to page information being held in correlation with a reference to the page information, comprising the steps of:

(a) interpreting a page request from the user and extracting the reference of page information and the space identification information;

(b) requesting page information referred to by the reference extracted in step (a) to a server which provides a hypertext;

(c) receiving the requested page information from the server which provides the hypertext;

(d) taking specific information for the page information received in step (c) out of the space specific information corresponding to the space identification information extracted in step (a), and adding the specific information to the page information;

(e) replacing the reference included in the received page information with the corresponding space identification information; and (f) providing the user with page information synthesized in steps (d) and (e) instead of original page information referred to by a reference specified by the user.

10. A method for providing a specific access space that specifies a path specific to a user who searches a hyperlink in a hypertext space composed of mutual link relation between one or more hypertexts provided by one or more servers, the specific access space being composed of space specific information for each user associated with the specific access space, and each piece of space specific information being identifiable by means of space identification information and specific information relative to page information received from the user being held in correlation with a reference to the page information, comprising the steps of:

(a) interpreting a page request from the user and extracting the reference of page information and the space identification information;

(b) requesting page information referred to by the reference extracted in step (a) to a server which provides a hypertext;

(c) receiving the requested page information from the server which provides the hypertext;

(d) taking specific information for the page information received in step (c) out of the space specific information corresponding to the space identification information extracted in step (a), and adding the specific information to the page information;

(e) replacing the reference included in the received page information with the corresponding space identification information; and (f) providing the user with the page information synthesized in steps (d) and (e) instead of an original page information referred to by the reference specified by the user.

11. A method for providing a specific access space that specifies a path specific to a user who searches a hyperlink in a hypertext space composed of mutual link relation between one or more hypertexts provided by one or more servers, the specific access space being composed of a link group formed by grouping one or more links that refer the page information and assigned a group identifier to be managed as link group data, comprising the steps of:

(a) interpreting a process request from the user and extracting a requested link group identifier and the process to be applied;

(b) requesting the page information referred to by each link included in the link group data corresponding to the link group identifier extracted in step (a) to a server which provides a hypertext;

(c) receiving the requested page information from the server which provides the hypertext;

(d) applying the process extracted in step (a) to a whole page information referred to by each link included in the link group to synthesize a virtual page; and (e) providing the user with information of the virtual page instead of original page information referred to by the reference specified by the user.

* * * * *